United States Patent [19]

Rundell

[11] 3,916,684

[45] Nov. 4, 1975

[54] METHOD AND APPARATUS FOR DEVELOPING A SURFACE WELL-DRILLING LOG

[75] Inventor: Herbert A. Rundell, Houston, Tex.

[73] Assignee: Texaco Inc., New York, N.Y.

[22] Filed: May 31, 1974

[21] Appl. No.: 474,994

Related U.S. Application Data

[63] Continuation-in-part of Ser. No. 296,423, Oct. 10, 1972, abandoned.

[52] U.S. Cl. .............................. 73/151.5; 73/151.5
[51] Int. Cl.² ........................................ E21B 49/00
[58] Field of Search ............... 73/151.5, 152, 151; 33/125 B, 133

[56] References Cited
UNITED STATES PATENTS

| | | |
|---|---|---|
| 3,324,717 | 6/1967 | Brooks et al. .......................... 73/152 |
| 3,368,400 | 2/1968 | Jorden, Jr. et al. ................. 73/151.5 |
| 3,522,727 | 8/1970 | Calhoun ............................. 73/151.5 |
| 3,541,852 | 11/1970 | Brown et al. .................. 73/151.5 X |
| 3,643,504 | 2/1972 | Rundell .............................. 73/151.5 |
| 3,785,202 | 1/1974 | Kelseaux et al. .................... 73/151.5 |

*Primary Examiner*—Jerry W. Myracle
*Attorney, Agent, or Firm*—T. H. Whaley; C. G. Ries; Henry C. Dearborn

[57] ABSTRACT

Method or system for developing a surface drilling log indicative of one or more parameters of the formation being drilled. Measurements include the bit revolutions, the depth of the bit in the hole, the weight on the bit, and a determination of tooth dullness of the bit. The results are correlated to produce a parameter in accordance with a predetermined relationship of the measurements and the determination.

16 Claims, 12 Drawing Figures

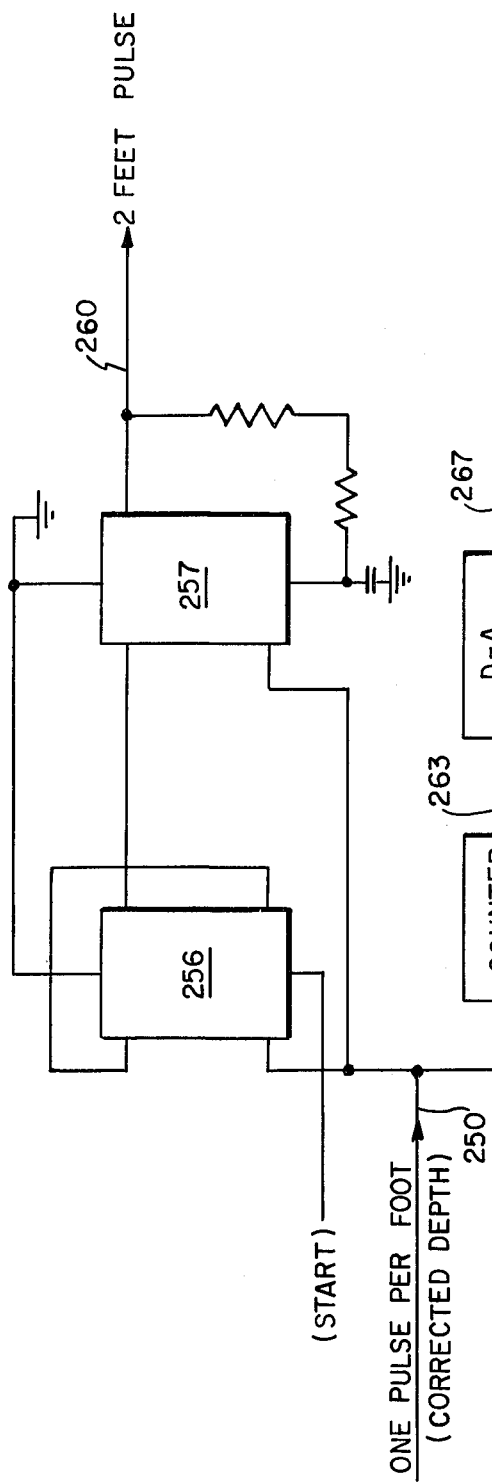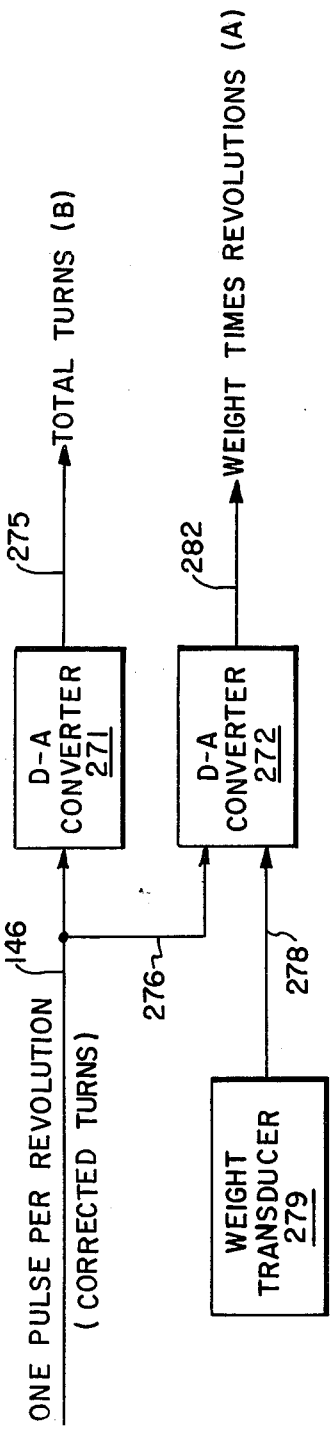

METHOD AND APPARATUS FOR DEVELOPING A SURFACE WELL-DRILLING LOG

CROSS-REFERENCES TO RELATED APPLICATIONS

This is a continuation-in-part of my copending application Ser. No. 296,423 filed Oct. 10, 1972 now abandoned. Also, this application includes, as part of the disclosure, a combination like that disclosed in a copending application Ser. No. 201,651 filed Nov. 24, 1971 (D No. 71,691), now U.S. Pat. No. 3,774,445 issued Nov. 27, 1973.

BRIEF SUMMARY OF THE INVENTION

This invention concerns generally a method and/or system for use in rotary-type well-drilling operations. More specifically, it concerns a method or combination such that a surface drilling log may be developed.

In the past, there have been some suggestions for obtaining data as a well is drilled and making a record thereof. Such suggestions purport to obtain such data in various ways. However, such efforts have not proved practical inproviding the ability to obtain useful information. Thus, in spite of past efforts, it still has been found necessary to run one or more instruments into the well following completion of the drilling thereof, in order to be able to obtain a meaningful log having data that is useful and related to formation changes.

Consequently, it is an object of this invention to provide a method and/or apparatus combination that can develop a meaningful log of data as the well is being drilled.

In brief, the invention concerns rotary-type bore-hole drilling wherein a bit is attached at the lower end of a drill string that is rotated while the downward force on said bit is being controlled. It concerns a method of developing a surface drilling log which comprises the steps of measuring the revolutions of said bit, and measuring the depth of said bit in the borehole. It also comprises the steps of measuring the weight on said bit, and determining the tooth dullness of said bit. In addition, it comprises the step of determining the characteristics of the formation which is being drilled by combining said measurements and said tooth-dullness determination.

Again, briefly, the invention relates to rotarytype borehole drilling wherein a bit is attached at the lower end of a drill string that is rotated while the downward force on said bit is controlled. It concerns the method of developing a surface drilling log which comprises the steps of measuring the revolutions of said bit by increments of a revolution, and measuring the depth of said bit in the borehole by cumulating incremental displacement of said bit which is in downward direction only, and calibrating said cumulative measurement to correct the total periodically. It also comprises the steps of measuring the weight on said bit and converting said bit weight to pulses, the frequency of which is proportional to said weight, and determining the tooth dullness of said bit by taking the ratio of the number of revolutions of said bit to a predetermined number. Finally, it also comprises correlating said depth measurement with a count of said weight pulses during said revolution increments over a predetermined interval of said depth.

Once more, briefly, the invention concerns a surface drilling log system for use with rotary-type well-drilling equipment having a bit attached at the lower end of a drill string and including means for rotating said string and bit while controlling the downward force on said bit. It comprises, in combination, means for measuring the depth of said bit in the well, and means for measuring the revolutions of said bit by increments thereof including means for generating gate signals at predetermined increments of said bit revolutions. It also comprises means for measuring the weight on said bit during said increments of the revolutions as the well is drilled, which includes means for generating variable-rate pulses at a rate dependent upon weight. And it comprises means for correlating said measurements to represent a parameter of the formations being drilled, which includes means for counting said variable-rate pulses during said increments to provide for a product of weight-times-revolutions. It also comprises means for recording said correlation of said measurements on a record medium as it is advanced, and means for advancing said record medium in accordance with the depth of said bit.

BRIEF DESCRIPTION OF THE DRAWINGS

The foregoing and other objects and benefits of the invention will be more fully set forth below in connection with the best mode contemplated by the inventor of carrying out the invention, and in connection with which there are illustrations provided in the drawings, wherein:

FIG. 3 is a schematic diagram including a block-diagram circuit showing, that illustrates in greater detail the element in FIG. 1 which develops signal C thereof;

FIG. 10 is a schematic circuit diagram partly in block form, illustrating the analog end of the depth channel;

FIG. 11 is a block diagram illustrating both the end of the revolutions channel and the weight-times-revolutions channel of the analog system.

DETAILED DESCRIPTION

Figure 1:
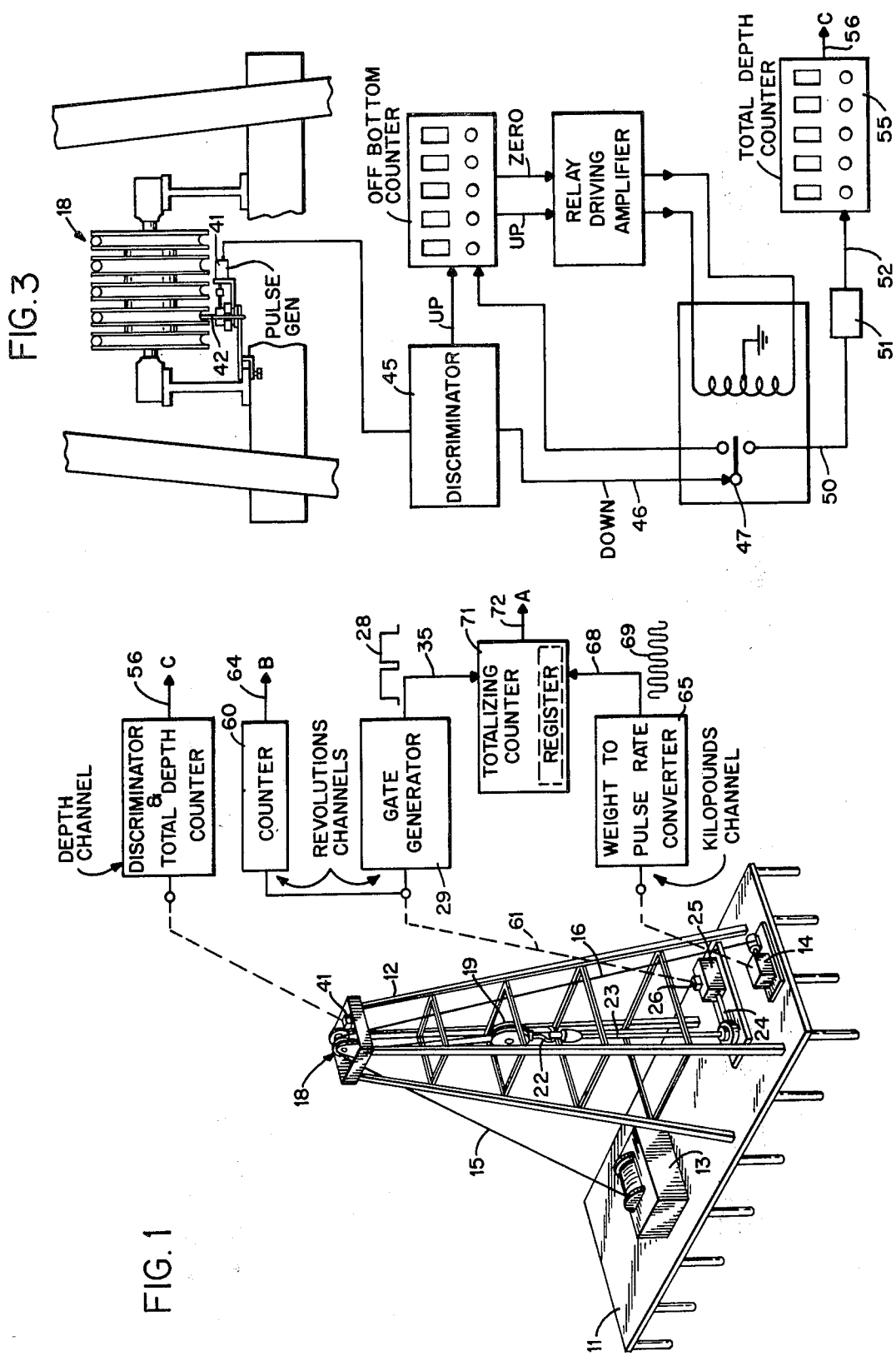
FIG. 1 is a schematic perspective with block-diagram showings, which illustrates a rotary-type drilling rig with elements for carrying out the invention.

Referring to FIG. 1, there is shown a drilling rig which includes a platform 11 upon which stands a derrick 12 and a draw works 13, as well as an anchor 14 for the free end or deadline 16 of a cable or drilling line 15 that is threaded over the sheaves of a crown block 18 and a traveling block 19. The traveling block, of course, has attached thereto the usual hook 22 for supporting the drill string (not shown) that is attached beneath a kelly 23. The drill string is rotated in a standard manner by a rotary drive employing an input shaft 24 that is being driven by an engine 25. There is also a tachometer 26 that provides an AC signal having a substantial number of cycles per revolution of the rotary driver shaft 24. While such tachometer signal may be developed in various ways, it may be developed by apparatus which takes the form shown and described in my U.S. Pat. No. 3,295,367. Thus, it is an AC signal generator that develops thirty electrical cycles per revolution of the rotary drive shaft 24, and in a typical case, there would be a gear ratio such that there are five revolutions of the drive shaft for each revolution of the rotary table. Consequently, there is an AC signal generated which has one hundred and fifty electrical cycles per revolution of the rotary table.

In the foregoing manner, the rotation of the drill string and the bit attached to the lower end thereof may be measured by increments of the revolutions. This is so since the signal developed by the tachometer 26 provides an AC signal having a predetermined number of cycles for each revolution. This aspect is described in more detail in the copending application noted above. As there indicated, the increments of a revolution of the drill string are developed into square-wave gate signals 28 within a gate generator 29. Generator 29 may take various forms but is preferably like that illustrated in FIG. 2, where it is indicated by a dashed-line rectangle captioned REVOLUTIONS CHANNEL. This, then, provides a gating signal once every two cycles of the AC generator frequency, by including in the circuit a "divide-by-2" element 33, as well as a one-shot multivibrator 34. The output of the multivibrator 34 goes over a circuit connection 35 to a gating signal input of a totalizing counter 71. The purpose of this gating signal is to permit incremental measurement of the weight on the bit during these increments of the bit rotation, as will appear more fully below.

In order to measure the weight being applied to the bit, the anchor 14 has a hook-load weight indicator which acts in the manner described in the aforementioned copending application. This is shown in more detail in FIG. 2. It introduces an input to a converter 65 which is indicated by the caption KILOPOUNDS CHANNEL. Converter 65 provides, over an output circuit 68, an AC pulse signal 69 that has a frequency or pulse rate directly dependent upon the weight as being measured by the weight indicator which is associated with anchor 14. This hook-load weight is, of course, corrected for the weight of that part of the drill string that is being lifted by the derrick, so as to leave the measured amount of downward force on the bit.

Figure 2:
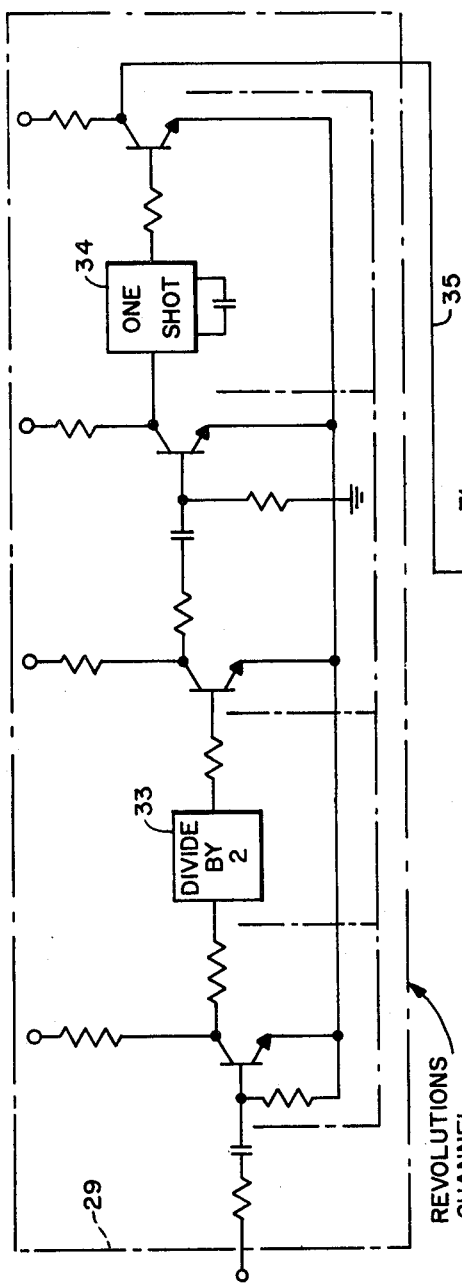
FIG. 2 is a partially schematic electrical circuit diagram which illustrates in greater detail some of the elements in FIG. 1.

It will be noted that the totalizing counter 71 receives inputs from each of the gate generator 29 and the converter 65, and its output is provided over a circuit connector 72. This circuit is indicated in the drawings by a capital letter A, and the details of developing the indicated kilopound signals in the circuit A are shown in FIG. 2. This measurement of a product of the weight on the bit times the revolutions thereof has been described in the aforementioned copending application, and it includes a hydraulic tubing 75 as indicated in dashed lines in FIG. 2. Hydraulic fluid in the tubing 75 applies fluid pressure to a Bourdon tube 76 that actuates a potentiometer sliding contactor 77 to produce a variable DC output on one side of a DC-to-frequency converter 78. The other side of the converter 78 has an adjustable DC signal supplied from another potentiometer slider 81. The converter 78 develops the variable-frequency pulse signal 69 that is transmitted over the circuit connection 68 which leads to one of the inputs of the totalizing counter 71, as already indicated.

The hook-load weight measurement determines the amount of hydraulic pressure in the tubing 75 and, thus, sets the slider 77 of the upper potentiometer, while slider 81 is manually adjustable. Consequently, the weight on the bit may be indicated by first setting the slider 81 to produce a null when the bit is lifted off the bottom. Then, when the bit is resting or drilling on bottom, the hook load will be reduced by the amount of weight on the bit, and this will be proportional to the DC difference signal taken between the sliders 77 and 81. Such DC difference signal is the input to the converter 78, and an instrument which may be employed in providing such DC signal is a Type E weight indicator which is manufactured by the Martin-Decker Corporation, Santa Ana, California. It is described in their Bulletin P-92.

In order to measure the depth of the bit in the hole, there is a pulse generator 41, shown in more detail in FIG. 3. It is driven from a resilient rimmed wheel 42 which is in friction contact with the underside of one of the sheaves of the crown block 18. In order to take account of only the downward movement of the bit, the signals from the pulse generator 41 are directed to a discriminator 45 that provides output signals over a circuit 46 which leads to a single-pole double-throw switch 47. When the pulses that represent the downward direction are being developed, they will be connected to a circuit 50 that leads to one side of a calibrator element 51 from which the circuit continues via a line 52 to a total-depth counter 55. The output of this counter is a depth signal that is carried over a circuit connection 56 which is identified as the signal C. The details of this depth-measuring pulse-counter system, with the exception of the calibrator element 51, are like the system disclosed in my U.S. Pat. No. 3,643,504.

The calibrator element 51 might take various forms, and it acts periodically to add or substract a pulse so as to correct for slight size errors in the wheel 42. It is preferably a presettable counter that, when filled, will either add a count, i.e., pulse, to the pulses on line 50, or block the next count, i.e., pulse, from passing.

In order to make a separate measurement for the revolutions of the drill string, there is a counter 60 (see FIG. 1) that has its input connected to the tachometer 26, along with the input to gate generator 29, as is indicated in a dashed line 61. The revolution counter 60 provides an output signal on circuit 64 which is identified as signal B. This is an AC signal having the frequency described above such that there are one hundred and fifty electrical cycles for each revolution of the drill string. It is converted to pulse-shaped signals for use in correlating the three signals A, B, and C.

Figure 4:
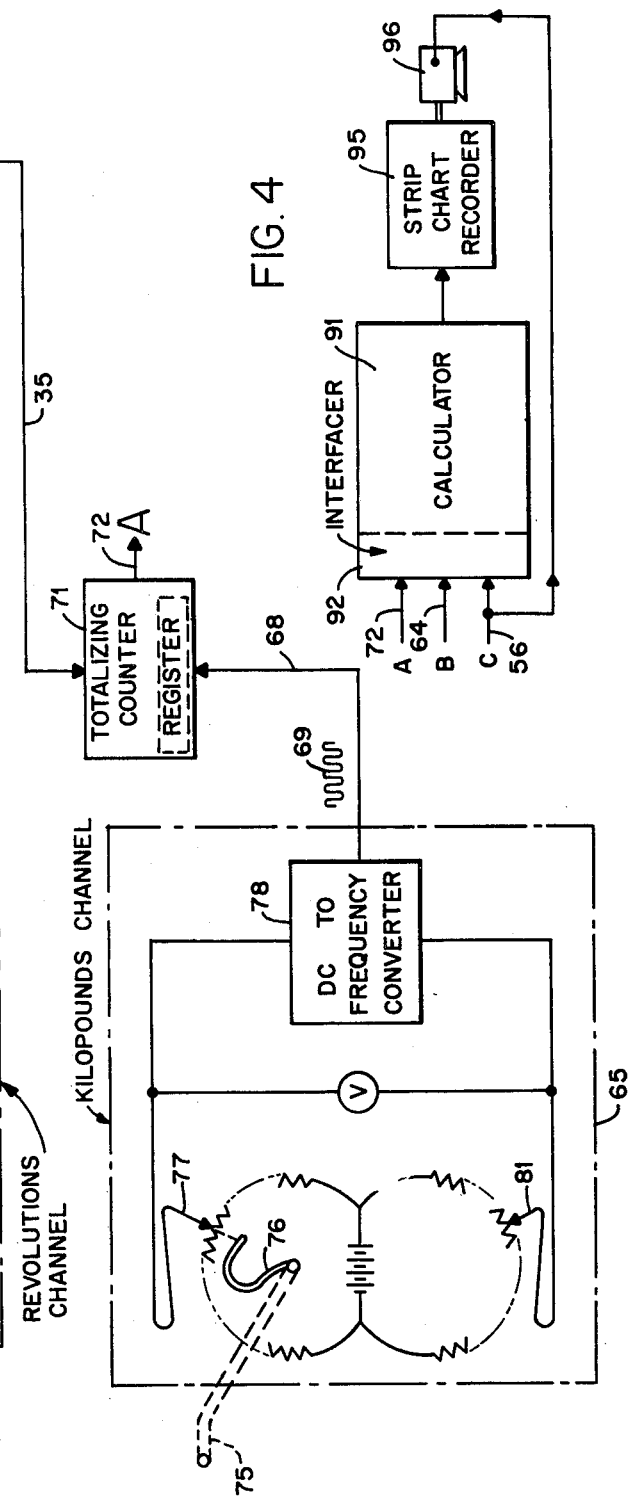
FIG. 4 is a schematic block diagram indicating the elements involved in correlating the three signals developed by the system according to FIG. 1, so as to produce a record of the desired parameter.

FIG. 4 illustrates, in block-diagram form, one way in which the measured quantities may be correlated so as to develop a log at the surface as the well is drilled, as desired. The arrangement includes a calculator 91 that may be any of various electronic calculators. e.g., one manufactured by Wang Laboratories, Inc., Tewksbury, Mass., designated Model 700A or 700B. However, in such case there is required an interfacer 92 in order to transform the signals as they are developed in the system and supplied over directions 72, 64, and 56, which are described as signals A, B, and C, respectively. These signals are transformed from binary coded digital signals to binary sixteen for input to the calculator. Such interfacer 92 may be one like that manufactured by Adams-Smith, Inc., Needham Heights, Mass., designated Model 100 Instrument Interface for feeding electrical measurements to the WANG 700 Series Calculators.

The measured data as represented by signals A, B, and C is correlated in accordance with the following expresssion so as to provide an output that may be applied to a strip chart recorder 95 which is advanced by stepping motor 96. In this manner, the record shows the recorded parameter in accordance with the depth of the bit and irrespective of the time element.

A simplified mathematical expression for the developed lithological parameter according to the invention may be expressed by the following equation:

$$SDL = K + ln \frac{(\Delta \text{Signal } A / \Delta \text{Signal } C)}{(k \sqrt{\text{Signal } B} \sqrt{\text{Signal } C})} \quad (1)$$

However, it is to be noted that in this expression (1) the "Signal B" represents not merely the revolutions measurement as described above in connection with the signal B on circuit connection 64. Rather, it includes a determination of tooth dullness of the bit, as will be set forth in more detail below. Thus, in the expression (1) the terms stand for the following:

SDL = Surface Drilling Log,
K = a constant,
ln = stands for "the natural logarithm of",
A = product of weight of the bit times the revolutions,
B = ratio of revolutions of the bit to a predetermined number representing final dullness,
C = depth of bit in the hole, and
k = a constant.

A determination of dullness of the bit is made by taking a ratio of counts from counter 60 (designated N) to a reference count which represents a final count at an arbitrary tooth dullness (designated N8). However, because of the nature of this dullness function, the formula (1) must be rewritten in the following way until the ratio N/N8 exceeds 0.125. Thus:

$$SDL = K + ln \frac{([4.32-11.3(N/N8)]\Delta \text{Signal } A / \Delta \text{Signal } C)}{(k \sqrt{\text{Signal } C})} \quad (2)$$

It may be noted that while other ways might be employed by one skilled in the art to make the dullness determination, it is carried out in this case by properly programming the calculator 91 to meet the formulas (1) and (2) above.

A specific example of a program for providing a surface drilling log in accordance with the invention is set forth below.

This program is applicable to a Wang electronic calculator Model 700 such as indicated above. It should be noted that the loading of the signals into the Wang is processed within steps 0000 through 0059. Also, input data is processed for use in the equation in steps 0060 through 0084. The decision for which equation to use is in step 0091, and if N/N8 < 0.125 the steps 0695 through 0713 are used, while if N/N8 > 0.125 steps 0095 through 0129 are used. AFter step 0129, the program goes through an averaging system and a driving of the typewriter.

The program codes for a 700 series Wang calculator are as follows:

700 SERIES PROGRAM CODES

| Code | Key | Code | Key |
|---|---|---|---|
| 0400 | + DIRECT | 0601 | — |
| 0401 | — DIRECT | 0602 | × |
| 0402 | × DIRECT | 0603 | ÷ |
| 0403 | ÷ DIRECT | 0604 | ↑ |
| 0404 | STORE DIRECT | 0605 | ↓ |
| 0405 | RECALL DIRECT | 0606 | ( ) |
| 0406 | ⟳ DIRECT | 0607 | \|X\| |
| 0407 | SEARCH | 0608 | INTEGER X |
| 0408 | MARK | 0609 | π |
| 0409 | GROUP 1 | 0610 | $\text{Log}_{10}X$ |
| 0410 | GROUP 2 | 0611 | $\text{Log}_e X$ |
| 0411 | WRITE | 0612 | $\sqrt{X}$ |
| 0412 | WRITE ALPHA | 0613 | $10^x$ |
| 0413 | END ALPHA | 0614 | $e^x$ |
| 0414 | STORE Y* | 0615 | 1/x |
| 0415 | RECALL Y* | | |
| | | 0700 | 0 |
| 0500 | + INDIR | 0701 | 1 |
| 0501 | — INDIR | 0702 | 2 |
| 0502 | × INDIR | 0703 | 3 |
| 0503 | ÷ INDIR | 0704 | 4 |
| 0504 | STORE INDIR | 0705 | 5 |
| 0505 | RECALL INDIR | 0706 | 6 |
| 0506 | ⟳ INDIR | 0707 | 7 |
| 0507 | SKIP if Y ≥ X | 0708 | 8 |
| 0508 | SKIP if Y < X | 0709 | 9 |
| 0509 | SKIP if Y = X | 0710 | SET EXP |
| 0510 | SKIP if ERROR | 0711 | CHANGE SIGN |
| 0511 | RETURN | 0712 | DECIMAL POINT |
| 0512 | END PROG | 0713 | $X^2$ |
| 0513 | LOAD PROG | 0174 | RECALL RESIDUE |
| 0514 | GO | 0715 | CLEAR X |
| 0515 | STOP | | |
| 0600 | + | | |

*ENTERED BY TOGGLE SWITCH SETTING

FOR MODEL 720 ONLY

| *Code | Operation | *Code | Operation |
|---|---|---|---|
| 1200 | + Direct | 1205 | RECALL DIRECT (+100) |
| 1201 | CT (+100) — Direct | 1206 | ⟳ DIRECT (+100) |
| 1202 | CT (+100) × Direct | 1214 | STORE Y (+100) |
| 1203 | CT (+100) ÷ Direct | 1215 | RECALL Y (+100) |
| 1204 | CT (+100) | | Store Direct |

-continued
FOR MODEL 720 ONLY

| *Code | Operation | *Code | Operation |
|---|---|---|---|
| | CT | | |
| | (+100) | | |

Any of these codes automatically adds 100 to the Storage Register number.
*These codes are generated by toggle switches and special operation keys.

SPECIAL COMMANDS which must be preceded by WRITE ALPHA
(Decimal Point Shifting)

| Code | Key | Operation |
|---|---|---|
| 0401 | − DIRECT | Divide X by $10^1$ |
| 0402 | × DIRECT | Divide X by $10^2$ |
| 0403 | ÷ DIRECT | Divide X by $10^3$ |
| 0404 | STORE DIRECT | Divide X by $10^4$ |
| 0405 | RECALL DIRECT | Divide X by $10^5$ |
| 0406 | ↻ DIRECT | Divide X by $10^6$ |
| 0407 | SEARCH | Divide X by $10^7$ |
| 0408 | MARK | Divide X by $10^8$ |
| 0409 | GROUP 1 | Divide X by $10^9$ |
| 0400 | + DIRECT | Divide X by $10^{10}$ |
| 0701 | 1 | Multiply X by $10^1$ |
| 0702 | 2 | Multiply X by $10^2$ |
| 0703 | 3 | Multiply X by $10^3$ |
| 0704 | 4 | Multiply X by $10^4$ |
| 0705 | 5 | Multiply X by $10^5$ |
| 0706 | 6 | Multiply X by $10^6$ |
| 0707 | 7 | Multiply X by $10^7$ |
| 0708 | 8 | Multiply X by $10^8$ |
| 0709 | 9 | Multiply X by $10^9$ |
| 0700 | 0 | Multiply X by $10^{10}$ |

DECISIONS

| Code | Key | Operation |
|---|---|---|
| 0410 | GROUP 2 | Skip if Y positive |
| 0411 | WRITE | Skip if Y = 0 |
| 0510 | SKIP if ERROR | Skip if Y negative |
| 0511 | RETURN | Skip if Y ≠ 0 |
| 0610 | $Log_{10}X$ | Skip if X positive |
| 0611 | $Log_eX$ | Skip if X = 0 |
| 0710 | SET EXP | Skip if X negative |
| 0711 | CHANGE SIGN | Skip if X ≠ 0 |

Miscellaneous

| Code | Key | Operation |
|---|---|---|
| 0615 | 1/X | Pause |
| 0514 | GO | 180/π |
| 0515 | STOP | π/180 |

The specific program for providing a surface drilling log and which illustrates the invention has 719 steps and is as follows:

700 PROGRAM

Title: SDL with Hold & Kilopound Revolution Drop-out

| Step | Code | Key | Comment |
|---|---|---|---|
| 0000 | 0408 | Mark | |
| 0001 | 0000 | 0 | |
| 0002 | 0409 | Group 1 | |
| 0003 | 1500 | Write Depth | |
| 0004 | 0604 | ↑ | |
| 0005 | 0409 | Group 1 | |
| 0006 | 1507 | Kilopound Rev. | |
| 0007 | 0414 | Store Y | |
| 0008 | 0003 | Depth × 10 | |
| 0009 | 0604 | ↑ | |
| 0010 | 0414 | Store Y | |
| 0011 | 0203 | Kilopound Rev. | |
| 0012 | 0415 | Recall Y | |
| 0013 | 0003 | Depth × 10 | |
| 0014 | 0701 | 1 | |
| 0015 | 0700 | 0 | Was Read Command |
| 0016 | 0603 | ÷ | true 2-foot depth |
| 0017 | 0702 | 2 | increase |
| 0018 | 0601 | − | |
| 0019 | 0405 | Recall Direct | |
| 0020 | 0200 | Depth −2 | |
| 0021 | 0509 | Skip if Y = X | |
| 0022 | 0407 | Search | |
| 0023 | 0000 | 0 | |

700 PROGRAM-continued

Title: SDL with Hold & Kilopound Revolution Drop-out

| Step | Code | Key | Comment |
|---|---|---|---|
| 0024 | 0409 | Group 1 | |
| 0025 | 1505 | N ÷ 10 | |
| 0026 | 0604 | ↑ | |
| 0027 | 0409 | Group 1 | |
| 0028 | 1503 | Time | |
| 0029 | 0414 | Store Y | |
| 0030 | 0004 | N ÷ 10 | |
| 0031 | 0514 | Go | |
| 0032 | 0514 | Go | |
| 0033 | 0604 | | |
| 0034 | 0414 | Store Y | |
| 0035 | 0101 | Time | |
| 0036 | 0701 | 1 | |
| 0037 | 0700 | 0 | |
| 0038 | 0403 | ÷ Direct | |
| 0039 | 0003 | Depth | |
| 0040 | 0701 | 1 | |
| 0041 | 0700 | 0 | |
| 0042 | 0402 | × Direct | |
| 0043 | 0004 | N | |
| 0044 | 0415 | Recall Y | |
| 0045 | 0203 | Kilopound ÷ 100 | |
| 0046 | 0701 | 1 | |
| 0047 | 0601 | − | |
| 0048 | 0412 | Write ALPHA } Skip if Y | Did kilopound |
| 0049 | 0510 | Skip if Error } negative | Rev. value |
| 0050 | 0407 | Search | enter calculator? |
| 0051 | 0805 | 85 | |
| 0052 | 0605 | ↓ | |
| 0053 | 0612 | $\sqrt{X}$ | |
| 0054 | 0409 | Group 1 | |
| 0055 | 1507 | Kilopound Rev. | |
| 0056 | 0404 | Store Direct | |
| 0057 | 0203 | 23 | |
| 0058 | 0408 | Mark | |
| 0059 | 0805 | 85 | |
| 0060 | 0701 | 1 | |
| 0061 | 0700 | 0 | |
| 0062 | 0700 | 0 | |
| 0063 | 0402 | × Direct | |
| 0064 | 0203 | Kilopound Rev. | Kilopound Rev. × 100 |
| 0065 | 0415 | Recall Y | |
| 0066 | 0203 | Kilopound Rev. | |
| 0067 | 0405 | Recall Direct | |
| 0068 | 0109 | Kilopound Rev.(D-2) | |
| 0069 | 0601 | − | |
| 0070 | 0414 | Store Y | |
| 0071 | 0002 | 2 | ΔKilopound Rev. |
| 0072 | 0408 | Mark | |
| 0073 | 0701 | 71 | |
| 0074 | 0415 | Recall Y | |
| 0075 | 0000 | $N_f$ | |
| 0076 | 0708 | 8 | |
| 0077 | 0602 | × | |
| 0078 | 0405 | Recall Direct | Calculate $N_K$ |
| 0079 | 0001 | $T_f$ | |
| 0080 | 0603 | ÷ | |
| 0081 | 0414 | Store Y | |
| 0082 | 0012 | 12 | $N_K$ |
| 0083 | 0405 | Recall Direct | |
| 0084 | 0004 | N | |
| 0085 | 0606 | ↺ | |
| 0086 | 0603 | ÷ | |
| 0087 | 0712 | Decimal Point | Dullness for D |
| 0088 | 0701 | 1 | |
| 0089 | 0702 | 2 | |
| | | | Dullness>1 |
| 0090 | 0705 | 5 | |
| 0091 | 0507 | Skip if Y ≥ X | |
| 0092 | 0407 | Search | |
| 0093 | 0300 | 30 | |
| 0094 | 0605 | ↓ | |
| 0095 | 0612 | $\sqrt{X}$ | |
| 0096 | 0404 | Store Direct | |
| 0097 | 0010 | 10 | $\sqrt{Dullness}$ |
| 0098 | 0405 | Recall Direct | |
| 0099 | 0003 | Depth | |

700 PROGRAM-continued

Title: SDL with Hold & Kilopound Revolution Drop-out

| Step | Code | Key | Comment |
|---|---|---|---|
| 0100 | 0612 | √X | √Depth |
| 0101 | 0415 | Recall Y | |
| 0102 | 0010 | 10 | √Dullness |
| 0103 | 0602 | × | |
| 0104 | 0405 | Recall Direct | |
| 0105 | 0005 | 5 | k = 100 |
| 0106 | 0602 | × | |
| 0107 | 0605 | ↓ | |
| 0108 | 0415 | Recall Y | |
| 0109 | 0002 | 2 | ΔKilopound Rev. |
| 0110 | 0603 | ÷ | SDL |
| 0111 | 0408 | Mark | |
| 0112 | 0209 | 29 | |
| 0113 | 0605 | ↓ | |
| 0114 | 0611 | Log$_e$X | |
| 0115 | 0415 | Recall Y | |
| 0116 | 0206 | 26 | Zero Shift |
| 0117 | 0600 | + | SDL in Y |
| 0118 | 0712 | Decimal Point | |
| 0119 | 0700 | 0 | |
| 0120 | 0700 | 0 | |
| 0121 | 0705 | 5 | |
| 0122 | 0600 | + | |
| 0123 | 0605 | ↓ | |
| 0124 | 0412 | Write ALPHA | × 100 |
| 0125 | 0702 | 2 | |
| 0126 | 0604 | ↑ | |
| 0127 | 0608 | Integer X | SDL 3 significant places |
| 0128 | 0404 | Store Direct | |
| 0129 | 0006 | 6 | SDL for D |
| 0130 | 0415 | Recall Y | |
| 0131 | 0007 | 7 | SDL for D-2 |
| 0132 | 0601 | − | |
| 0133 | 0605 | ↓ | |
| 0134 | 0607 | \|X\| | ΔSDL$_D$ & SDL$_{D-2}$ |
| 0135 | 0604 | | |
| 0136 | 0405 | Recall Direct | |
| 0137 | 0106 | 16 | Average Span |
| 0138 | 0507 | Skip if Y ≥ X | Is SDL$_{D-2}$ outside |
| 0139 | 0407 | Search | Average of Span |
| 0140 | 0302 | 32 | |
| 0141 | 0415 | Recall Y | |
| 0142 | 0007 | 7 | SDL for D-2 |
| 0143 | 0405 | Recall Direct | |
| 0144 | 0008 | 8 | SDL for D-4 |
| 0145 | 0601 | − | |
| 0146 | 0605 | ↓ | |
| 0147 | 0607 | \|X\| | ΔSDL D-2 & D-4 |
| 0148 | 0604 | ↑ | |
| 0149 | 0405 | Recall Direct | |
| 0150 | 0106 | 16 | Average Span |
| 0151 | 0507 | Skip if Y>X | Is ΔSDL>Average. |
| 0152 | 0407 | Search | Span |
| 0153 | 0304 | 34 | |
| 0154 | 0415 | Recall Y | |
| 0155 | 0007 | 7 | SDL for D-2 |
| 0156 | 0414 | Store Y | |
| 0157 | 0009 | 9 | SDL$_{D-2}$ to be plotted |
| 0158 | 0407 | Search | |
| 0159 | 0305 | 35 | |
| 0160 | 0408 | Mark | D-4 not to be used |
| 0161 | 0304 | 34 | in Average for D-2 |
| 0162 | 0415 | Recall Y | But D is to be used |
| 0163 | 0007 | 7 | SDL for D-2 |
| 0164 | 0702 | 2 | |
| 0165 | 0602 | × | |
| 0166 | 0405 | Recall Direct | SDL for D |
| 0167 | 0008 | 8 | |
| 0168 | 0600 | + | |
| 0169 | 0703 | 3 | |
| 0170 | 0603 | ÷ | |
| 0171 | 0605 | ↓ | |
| 0172 | 0608 | Integer X | |
| 0173 | 0404 | Store Direct | Average SDL to be |
| 0174 | 0009 | 9 | plotted (3 places) |
| 0175 | 0407 | Search | IS SDL plotted >60 |
| 0176 | 0305 | 35 | |
| 0177 | 0408 | Mark | Is D not to be used in |
| 0178 | 0302 | 32 | Average of D-2 |
| 0179 | 0415 | Recall Y | |
| 0180 | 0007 | 7 | D-2 |
| 0181 | 0405 | Recall Direct | D-4 |
| 0182 | 0008 | 8 | |
| 0183 | 0601 | − | |
| 0184 | 0605 | ↓ | |
| 0185 | 0607 | \|X\| | ΔD-2 & D-4 |
| 0186 | 0604 | ↑ | |
| 0187 | 0405 | Recall Direct | |
| 0188 | 0106 | 16 | Average Span |
| 0189 | 0507 | Skip if Y ≥ X | |
| 0190 | 0407 | Search | |
| 0191 | 0303 | 33 | |
| 0192 | 0415 | Recall Y | |
| 0193 | 0007 | 7 | |
| 0194 | 0702 | 2 | |
| 0195 | 0602 | × | 2 (D-2)+D |
| 0196 | 0405 | Recall Direct | ─────── |
| 0197 | 0006 | 6 | 3 |
| 0198 | 0600 | + | |
| 0199 | 0703 | 3 | |
| 0200 | 0603 | ÷ | |
| 0201 | 0605 | ↓ | |
| 0202 | 0608 | Integer X | SDL to be plotted |
| 0203 | 0404 | Store Direct | |
| 0204 | 0009 | 9 | |
| 0205 | 0407 | Search | is SDL plotting value |
| 0206 | 0305 | 35 | greater than 61 |
| 0207 | 0408 | Mark | Average for D-2 |
| 0208 | 0303 | 33 | & D-4 |
| 0209 | 0415 | Recall Y | |
| 0210 | 0007 | 7 | D-2 |
| 0211 | 0702 | 2 | × 2 |
| 0212 | 0602 | × | |
| 0213 | 0405 | Recall Direct | + D |
| 0214 | 0006 | 6 | |
| 0215 | 0600 | + | + D-4 |
| 0216 | 0405 | Recall Direct | |
| 0217 | 0008 | 8 | ÷ |
| 0218 | 0600 | + | 4 |
| 0219 | 0704 | 4 | |
| 0220 | 0603 | ÷ | |
| 0221 | 0605 | ↓ | Average |
| 0222 | 0608 | Integer X | SDL to be plotted |
| 0223 | 0404 | Store Direct | |
| 0224 | 0009 | 0 | |
| 0225 | 0408 | Mark | |
| 0226 | 0305 | 35 | Is SDL>60 |
| 0227 | 0706 | 6 | |
| 0228 | 0701 | 1 | |
| 0229 | 0700 | 0 | |
| 0230 | 0507 | Skip if Y ≥ X | |
| 0231 | 0407 | Search | (Step 244) |
| 0232 | 0601 | 61 | SDL<60 |
| 0233 | 0706 | 6 | Subtract 60 |
| 0234 | 0700 | 0 | from SDL and |
| 0235 | 0700 | 0 | store |
| 0236 | 0601 | − | |
| 0237 | 0414 | Store Y | |
| 0238 | 0009 | 9 | |
| 0239 | 0701 | 1 | 1 in X |
| 0240 | 0404 | Store Direct | Code to Print + |
| 0241 | 0204 | 24 | |
| 0242 | 0407 | Search | Step 250 |
| 0243 | 0602 | 62 | |
| 0244 | 0408 | Mark | |
| 0245 | 0601 | 61 | |
| 0246 | 0702 | 2 | |
| 0247 | 0404 | Store Direct | Code to print "." |
| 0248 | 0204 | 24 | |
| 0249 | 0408 | Mark | |
| 0250 | 0602 | 62 | |
| 0251 | 0405 | Recall Direct | |
| 0252 | 0006 | 6 | |
| 0253 | 0406 | ↻ | |
| 0254 | 0007 | 7 | |
| 0255 | 0406 | ↻ | |
| 0256 | 0008 | 8 | |
| 0257 | 0405 | Recall Direct | |
| 0258 | 0009 | 9 | |
| 0259 | 0412 | Write ALPHA | ÷ X by 10 |
| 0260 | 0401 | − Direct | |

700 PROGRAM-continued

Title: SDL with Hold & Kilopound Revolution Drop-out

| Step | Code | Key | Comment |
|------|------|-----|---------|
| 0261 | 0608 | Integer X | |
| 0262 | 0404 | Store Direct | |
| 0263 | 0009 | 9 | |
| 0264 | 0412 | Write ALPHA | Typewriter ON |
| 0265 | 1200 | ON | Typewriter ON |
| 0266 | 0413 | End ALPHA | |
| 0267 | 0412 | Write ALPHA | ½ second pause |
| 0268 | 0615 | 1/x | |
| 0269 | 0415 | Recall Y | |
| 0270 | 0200 | 20 | Depth |
| 0271 | 0605 | ↓ | |
| 0272 | 0412 | Write ALPHA | ÷ 100 |
| 0273 | 0402 | × Direct | |
| 0274 | 0608 | Integer X | |
| 0275 | 0412 | Write ALPHA | × 100 |
| 0276 | 0702 | 2 | |
| 0277 | 0606 | ↻ | |
| 0278 | 0508 | Skip if Y<X | |
| 0279 | 0407 | Search | For D even 100 feet |
| 0280 | 0306 | 36 | |
| 0281 | 0412 | Write ALPHA | |
| 0282 | 0008 | Tab | |
| 0283 | 0413 | End ALPHA | |
| 0284 | 0412 | Write ALPHA | |
| 0285 | 0209 | | |
| 0286 | 0413 | End ALPHA | |
| 0287 | 0415 | Recall Y | |
| 0288 | 0009 | 9 | |
| 0289 | 0701 | 1 | |
| 0290 | 0508 | Skip if Y<X | |
| 0291 | 0407 | Search | |
| 0292 | 0604 | 64 | |
| 0293 | 0412 | Write ALPHA | |
| 0294 | 0109 | Type O | |
| 0295 | 0413 | End ALPHA | |
| 0296 | 0404 | Store Direct | |
| 0297 | 0205 | 25 | |
| 0298 | 0412 | Write ALPHA | |
| 0299 | 0008 | Tab | |
| 0300 | 0413 | End ALPHA | |
| 0301 | 0407 | Search | |
| 0302 | 0802 | 82 | |
| 0303 | 0408 | Mark | |
| 0304 | 0604 | 64 | |
| 0305 | 0701 | 1 | |
| 0306 | 0706 | 6 | |
| 0307 | 0508 | Skip if Y<X | |
| 0308 | 0407 | Search | |
| 0309 | 0606 | 66 | |
| 0310 | 0701 | 1 | |
| 0311 | 0404 | Store Direct | |
| 0312 | 0205 | 25 | |
| 0313 | 0701 | 1 | |
| 0314 | 0704 | 4 | |
| 0315 | 0509 | Skip if Y = X | |
| 0316 | 0407 | Search | |
| 0317 | 0605 | 65 | |
| 0318 | 0407 | Search | |
| 0319 | 0104 | 14 | |
| 0320 | 0408 | Mark | |
| 0321 | 0605 | 65 | |
| 0322 | 0701 | 1 | |
| 0323 | 0705 | 5 | |
| 0324 | 0509 | Skip if Y = X | |
| 0325 | 0407 | Search | |
| 0326 | 0103 | 13 | |
| 0327 | 0407 | Search | |
| 0328 | 0105 | 15 | |
| 0329 | 0408 | Mark | |
| 0330 | 0606 | 66 | |
| 0331 | 0703 | 3 | |
| 0332 | 0701 | 1 | |
| 0333 | 0508 | Skip if Y<X | |
| 0334 | 0407 | Search | |
| 0335 | 0609 | 69 | |
| 0336 | 0702 | 2 | |
| 0337 | 0404 | Store Direct | |
| 0338 | 0205 | 25 | |
| 0339 | 0412 | Print ALPHA | |
| 0340 | 0008 | Tab | |
| 0341 | 0413 | End ALPHA | |
| 0342 | 0701 | 1 | |
| 0343 | 0705 | 5 | |
| 0344 | 0601 | − | |
| 0345 | 0414 | Store Y | |
| 0346 | 0009 | 9 | |
| 0347 | 0408 | Mark | |
| 0348 | 0700 | 70 | |
| 0349 | 0701 | 1 | |
| 0350 | 0704 | 4 | |
| 0351 | 0509 | Skip if Y = X | |
| 0352 | 0407 | Search | |
| 0353 | 0607 | 67 | |
| 0354 | 0407 | Search | |
| 0355 | 0104 | 14 | |
| 0356 | 0408 | Mark | |
| 0357 | 0607 | 67 | |
| 0358 | 0701 | 1 | |
| 0359 | 0705 | 5 | |
| 0360 | 0509 | Skip if Y = X | |
| 0361 | 0407 | Search | |
| 0362 | 0608 | 68 | |
| 0363 | 0407 | Search | |
| 0364 | 0105 | 15 | |
| 0365 | 0408 | Mark | |
| 0366 | 0608 | 68 | |
| 0367 | 0412 | Print ALPHA | |
| 0368 | 0002 | Space | |
| 0369 | 0413 | End ALPHA | |
| 0370 | 0407 | Search | |
| 0371 | 0103 | 13 | |
| 0372 | 0408 | Mark | |
| 0373 | 0609 | 69 | |
| 0374 | 0415 | Recall Y | |
| 0375 | 0009 | 9 | |
| 0376 | 0704 | 4 | |
| 0377 | 0706 | 6 | |
| 0378 | 0508 | Skip if Y<X | |
| 0379 | 0407 | Search | |
| 0380 | 0702 | 72 | |
| 0381 | 0703 | 3 | |
| 0382 | 0404 | Store Direct | |
| 0383 | 0205 | 25 | |
| 0384 | 0412 | Write ALPHA | |
| 0385 | 0008 | Tab | |
| 0386 | 0008 | Tab | |
| 0387 | 0413 | End ALPHA | |
| 0388 | 0703 | 3 | |
| 0389 | 0700 | 0 | |
| 0390 | 0601 | − | |
| 0391 | 0414 | Store Y | |
| 0392 | 0009 | 9 | |
| 0393 | 0407 | Search | |
| 0394 | 0700 | 70 | |
| 0395 | 0408 | Mark | |
| 0396 | 0702 | 72 | |
| 0397 | 0704 | 4 | |
| 0398 | 0404 | Store Direct | |
| 0399 | 0205 | 25 | |
| 0400 | 0412 | Write ALPHA | |
| 0401 | 0008 | Tab | |
| 0402 | 0009 | Tab | |
| 0403 | 0008 | Tab | |
| 0404 | 0413 | End ALPHA | |
| 0405 | 0415 | Recall Y | |
| 0406 | 0009 | 9 | |
| 0407 | 0704 | 4 | |
| 0408 | 0705 | 5 | |
| 0409 | 0601 | − | |
| 0410 | 0414 | Store Y | |
| 0411 | 0009 | 9 | |
| 0412 | 0407 | Search | |
| 0413 | 0700 | 7 | |
| 0414 | 0408 | Mark | |
| 0415 | 0103 | 13 | |
| 0416 | 0701 | 1 | |
| 0417 | 0404 | Store Direct | |
| 0418 | 0103 | 13 | |
| 0419 | 0408 | Mark | |
| 0420 | 0705 | 75 | |

700 PROGRAM-continued

Title: SDL with Hold & Kilopound Revolution Drop-out

| Step | Code | Key | Comment |
|------|------|-----|---------|
| 0421 | 0415 | Recall Y | |
| 0422 | 0103 | 13 | |
| 0423 | 0405 | Recall Direct | |
| 0424 | 0009 | 9 | |
| 0425 | 0509 | Skip if Y = X | |
| 0426 | 0407 | Search | |
| 0427 | 0708 | 78 | |
| 0428 | 0415 | Recall Y | |
| 0429 | 0204 | 24 | |
| 0430 | 0701 | 1 | |
| 0431 | 0509 | Skip if Y = X | |
| 0432 | 0407 | Search | |
| 0433 | 0706 | 76 | |
| 0434 | 0412 | Write ALPHA | |
| 0435 | 0103 | Shift Up | |
| 0436 | 0006 | + (Print) | |
| 0437 | 0102 | Shift Down | |
| 0438 | 0413 | End ALPHA | |
| 0439 | 0407 | Search | |
| 0440 | 0707 | 77 | |
| 0441 | 0408 | Mark | |
| 0442 | 0706 | 76 | |
| 0443 | 0412 | Write ALPHA | |
| 0444 | 0106 | (Print) | |
| 0445 | 0413 | End ALPHA | |
| 0446 | 0408 | Mark | |
| 0447 | 0707 | 77 | |
| 0448 | 0412 | Write ALPHA | |
| 0449 | 0008 | Tab | |
| 0450 | 0413 | End ALPHA | |
| 0451 | 0407 | Search | |
| 0452 | 0802 | 82 | |
| 0453 | 0408 | Mark | |
| 0454 | 0708 | 78 | |
| 0455 | 0412 | Write ALPHA | |
| 0456 | 0002 | Space | |
| 0457 | 0413 | End ALPHA | |
| 0458 | 0701 | 1 | |
| 0459 | 0400 | + Direct | |
| 0460 | 0103 | 13 | |
| 0461 | 0407 | Search | |
| 0462 | 0705 | 75 | |
| 0463 | 0408 | Mark | |
| 0464 | 0104 | 14 | |
| 0465 | 0412 | Write ALPHA | |
| 0466 | 0008 | Tab | |
| 0467 | 0003 | Back Space | |
| 0468 | 0413 | End ALPHA | |
| 0469 | 0415 | Recall Y | |
| 0470 | 0204 | 24 | |
| 0471 | 0701 | 1 | |
| 0472 | 0509 | Skip if Y = X | |
| 0473 | 0407 | Search | |
| 0474 | 0709 | 79 | |
| 0475 | 0412 | Write ALPHA | |
| 0476 | 0103 | Shift Up | |
| 0477 | 0006 | + (Print) | |
| 0478 | 0102 | Shift Down | |
| 0479 | 0413 | End ALPHA | |
| 0480 | 0407 | Search | |
| 0481 | 0800 | 80 | |
| 0482 | 0408 | Mark | |
| 0483 | 0709 | 79 | |
| 0484 | 0412 | Write ALPHA | |
| 0485 | 0106 | "."(Print) | |
| 0486 | 0413 | End ALPHA | |
| 0487 | 0408 | Mark | |
| 0488 | 0800 | 80 | |
| 0489 | 0407 | Search | |
| 0490 | 0802 | 82 | |
| 0491 | 0408 | Mark | |
| 0492 | 0105 | 15 | |
| 0493 | 0412 | Write ALPHA | |
| 0494 | 0008 | Tab | |
| 0495 | 0413 | End ALPHA | |
| 0496 | 0415 | Recall Y | |
| 0497 | 0204 | 24 | |
| 0498 | 0701 | 1 | |
| 0499 | 0509 | Skip if Y = X | |
| 0500 | 0407 | Search | |
| 0501 | 0801 | 81 | |
| 0502 | 0412 | Write ALPHA | |
| 0503 | 0103 | Shift Up | |
| 0504 | 0006 | "+"(Print) | |
| 0505 | 0102 | Shift Down | |
| 0506 | 0413 | End ALPHA | |
| 0507 | 0407 | Search | |
| 0508 | 0802 | 82 | |
| 0509 | 0408 | Mark | |
| 0510 | 0801 | 81 | |
| 0511 | 0412 | Write ALPHA | |
| 0512 | 0106 | " ."(Print) | |
| 0513 | 0413 | End ALPHA | |
| 0514 | 0408 | Mark | |
| 0515 | 0802 | 82 | |
| 0516 | 0412 | Write ALPHA | |
| 0517 | 0008 | Tab | |
| 0518 | 0413 | End ALPHA | |
| 0519 | 0701 | 1 | |
| 0520 | 0400 | + Direct | |
| 0521 | 0205 | 25 | |
| 0522 | 0408 | Mark | |
| 0523 | 0803 | 83 | |
| 0524 | 0415 | Recall Y | |
| 0525 | 0205 | 25 | |
| 0526 | 0705 | 5 | |
| 0527 | 0507 | Skip if Y ≥ X | |
| 0528 | 0407 | Search | |
| 0529 | 0804 | 84 | |
| 0530 | 0407 | Search | |
| 0531 | 0308 | 38 | |
| 0532 | 0408 | Mark | |
| 0533 | 0804 | 84 | |
| 0534 | 0412 | Write ALPHA | |
| 0535 | 0008 | Tab | |
| 0536 | 0413 | End ALPHA | |
| 0537 | 0701 | 1 | |
| 0538 | 0400 | + Direct | |
| 0539 | 0205 | 25 | |
| 0540 | 0407 | Search | |
| 0541 | 0803 | 83 | |
| 0542 | 0408 | Mark | |
| 0543 | 0306 | 36 | |
| 0544 | 0405 | Recall Direct | |
| 0545 | 0200 | 20 | Depth -2 into X |
| 0546 | 0411 | Write | Print D-2 if |
| 0547 | 0500 | 5.0 | 100 feet |
| 0548 | 0412 | Write ALPHA | |
| 0549 | 0002 | Space | |
| 0550 | 0209 | "1" (Print) | |
| 0551 | 0413 | End ALPHA | |
| 0552 | 0701 | 1 | |
| 0553 | 0404 | Store Direct | |
| 0554 | 0103 | 13 | |
| 0555 | 0415 | Recall Y | |
| 0556 | 0009 | 9 | |
| 0557 | 0508 | Skip if Y<X | |
| 0558 | 0407 | Search | |
| 0559 | 0403 | 43 | |
| 0560 | 0412 | Write ALPHA | |
| 0561 | 0109 | "o" (Print) | |
| 0562 | 0413 | End ALPHA | |
| 0563 | 0407 | Search | |
| 0564 | 0406 | 46 | |
| 0565 | 0408 | Mark | |
| 0566 | 0403 | 43 | |
| 0567 | 0509 | Skip if Y = X | |
| 0568 | 0407 | Search | |
| 0569 | 0404 | 44 | |
| 0570 | 0412 | Write ALPHA | |
| 0571 | 0106 | "."(Print) | |
| 0572 | 0413 | End ALPHA | |
| 0573 | 0407 | Search | |
| 0574 | 0406 | 46 | |
| 0575 | 0408 | Mark | |
| 0576 | 0404 | 44 | |
| 0577 | 0412 | Write ALPHA | |
| 0578 | 0000 | "—"(Print) | |
| 0579 | 0413 | End ALPHA | |
| 0580 | 0701 | 1 | |
| 0581 | 0400 | + Direct | |
| 0582 | 0013 | 13 | |

700 PROGRAM-continued

Title: SDL with Hold & Kilopound Revolution Drop-out

| Step | Code | Key | Comment |
|---|---|---|---|
| 0583 | 0405 | Recall Direct | |
| 0584 | 0013 | 13 | |
| 0585 | 0509 | Skip if Y = X | |
| 0586 | 0407 | Search | |
| 0587 | 0404 | 44 | |
| 0588 | 0415 | Recall Y | |
| 0589 | 0204 | 24 | |
| 0590 | 0701 | 1 | |
| 0591 | 0509 | Skip if Y= X | |
| 0592 | 0407 | Search | |
| 0593 | 0207 | 27 | |
| 0594 | 0407 | Search | |
| 0595 | 0208 | 28 | |
| 0596 | 0408 | Mark | |
| 0597 | 0207 | 27 | |
| 0598 | 0412 | Write ALPHA | |
| 0599 | 0106 | "."(Print) | |
| 0600 | 0413 | End ALPHA | |
| 0601 | 0407 | Search | |
| 0602 | 0406 | 46 | |
| 0603 | 0408 | Mark | |
| 0604 | 0208 | 28 | |
| 0605 | 0412 | Write ALPHA | |
| 0606 | 0103 | Shift Up | |
| 0607 | 0006 | + (Print) | |
| 0608 | 0102 | Shift Down | |
| 0609 | 0413 | End ALPHA | |
| 0610 | 0408 | Mark | |
| 0611 | 0406 | 46 | |
| 0612 | 0701 | 1 | |
| 0613 | 0400 | + Direct | |
| 0614 | 0013 | 13 | |
| 0615 | 0415 | Recall Y | |
| 0616 | 0013 | 13 | |
| 0617 | 0706 | 6 | |
| 0618 | 0701 | 1 | |
| 0619 | 0507 | Skip if Y ⩾ X | |
| 0620 | 0407 | Search | |
| | 0407 | 47 | |
| 0621 | | | |
| 0622 | 0412 | Write ALPHA | |
| 0623 | 0008 | Tab | |
| 0524 | 0413 | End ALPHA | |
| 0625 | 0407 | Search | |
| 0626 | 0308 | 38 | |
| 0627 | 0408 | Mark | |
| 0628 | 0407 | 47 | |
| 0629 | 0412 | Write ALPHA | |
| 0630 | 0000 | – (Print) | |
| 0631 | 0413 | End ALPHA | |
| 0632 | 0407 | Search | |
| 0633 | 0406 | 46 | |
| 0634 | 0408 | Mark | |
| 0635 | 0308 | 38 | |
| 0636 | 0415 | Recall Y | |
| 0637 | 0200 | 20 | |
| 0638 | 0704 | 4 | |
| 0639 | 0603 | ÷ | |
| 0640 | 0605 | ↓ | |
| 0641 | 0608 | Integer X | |
| 0642 | 0509 | Skip if Y= X | |
| 0643 | 0407 | Search | |
| 0644 | 0408 | 48 | |
| 0645 | 0412 | Write ALPHA | |
| 0646 | 0008 | Tab | |
| 0647 | 0413 | End ALPHA | |
| 0648 | 0407 | Search | |
| 0649 | 0408 | 48 | |
| 0650 | 0408 | Mark | |
| 0651 | 0408 | 48 | |
| 0652 | 0405 | Recall Direct | |
| 0653 | 0003 | 3 | |
| 0654 | 0406 | ⟳ | |
| 0655 | 0200 | 20 | |
| 0656 | 0411 | Write | |
| 0657 | 0500 | 5.0 | } Print Depth -21 |
| 0658 | 0412 | Write ALPHA | |
| 0659 | 0008 | Tab | |
| 0660 | 0008 | Tab | |
| 0661 | 0413 | End ALPHA | |
| 0662 | 0405 | Recall Direct | |

700 PROGRAM-continued

Title: SDL with Hold & Kilopound Revolution Drop-out

| Step | Code | Key | Comment |
|---|---|---|---|
| 0663 | 0203 | 23 | |
| 0664 | 0406 | ⟳ | |
| 0665 | 0109 | 19 | |
| 0666 | 0411 | Write | Print Kilopound |
| 0667 | 0900 | 9.0 | Rev.-23 |
| 0668 | 0412 | Write ALPHA | |
| 0669 | 0008 | Tab | |
| 0670 | 0008 | Tab | |
| 0671 | 0413 | End ALPHA | |
| 0672 | 0405 | Recall Direct | |
| 0673 | 0004 | 4 | |
| 0674 | 0406 | ⟳ | |
| 0675 | 0108 | 18 | |
| 0676 | 0411 | Write | } Print N |
| 0677 | 0600 | 6.0 | |
| 0678 | 0412 | Write ALPHA | |
| 0679 | 0008 | Tab | |
| 0680 | 0008 | Tab | |
| 0681 | 0413 | End ALPHA | |
| 0682 | 0405 | Recall Direct | |
| 0683 | 0101 | 11 | |
| 0684 | 0406 | ⟳ Direct | |
| 0685 | 0107 | 17 | |
| 0686 | 0411 | Write | } Print T |
| 0687 | 0500 | 5.0 | |
| 0688 | 0412 | Write ALPHA | |
| 0689 | 0108 | Return Carriage | Typewriter OFF |
| 0690 | 1201 | OFF | |
| 0691 | 0413 | End ALPHA | |
| 0692 | 0407 | Search | |
| 0693 | 0500 | 50 | |
| 0694 | 0408 | Mark | |
| 0695 | 0300 | 30 | |
| 0696 | 0405 | Recall Direct | |
| 0697 | 0201 | 21 | |
| 0698 | 0602 | × | |
| 0699 | 0405 | Recall Direct | |
| 0700 | 0202 | 22 | |
| 0701 | 0600 | + | |
| 0702 | 0405 | Recall Direct | |
| 0703 | 0002 | 2 | |
| 0704 | 0602 | × | |
| 0705 | 0405 | Recall Direct | |
| 0706 | 0003 | 3 | |
| 0707 | 0612 | $\sqrt{X}$ | |
| 0708 | 0603 | + | |
| 0709 | 0405 | Recall Direct | |
| 0710 | 0005 | 5 | |
| 0711 | 0603 | + | |
| 0712 | 0407 | Search | |
| 0713 | 0209 | 29 | |
| 0714 | 0408 | Mark | |
| 0715 | 0500 | 50 | |
| 0716 | 0407 | Search | |
| 0717 | 0000 | 0 | |
| 0718 | 0515 | Stop | |
| 0719 | 0512 | END Program | |

It should be noted that the principles of the invention are applicable to developing a surface drilling log that is more sophisticated than that described above. Thus, in addition to correlating measurements and/or determination of the four elements of rotation of the bit, weight on the bit, tooth dullness and depth of the bit in the hole, a log may include the effects of one or more additional measurements. Such additional factors might include: bit type, bit hydraulic horsepower, torque, vibrational amplitude (longitudinal), vibration frequency (longitudinal), and fluid properties (e.g., plastic viscosity of mud, yield point of mud, mud density, and mud temperature).

It will be understood by one skilled in the art that, while a particular combination of apparatus elements has been shown and described above, there are other equivalent elements that might be employed in carrying out the invention. Thus, instead of employing the calculator 91 and the interfacer 92 (see FIG. 4), a system using electronic circuits without any programmed type of computer such as the Wang calculator indicated above, may be in accordance with the modification which follows.

FIGURES 5–12 MODIFICATION

Figure 5:
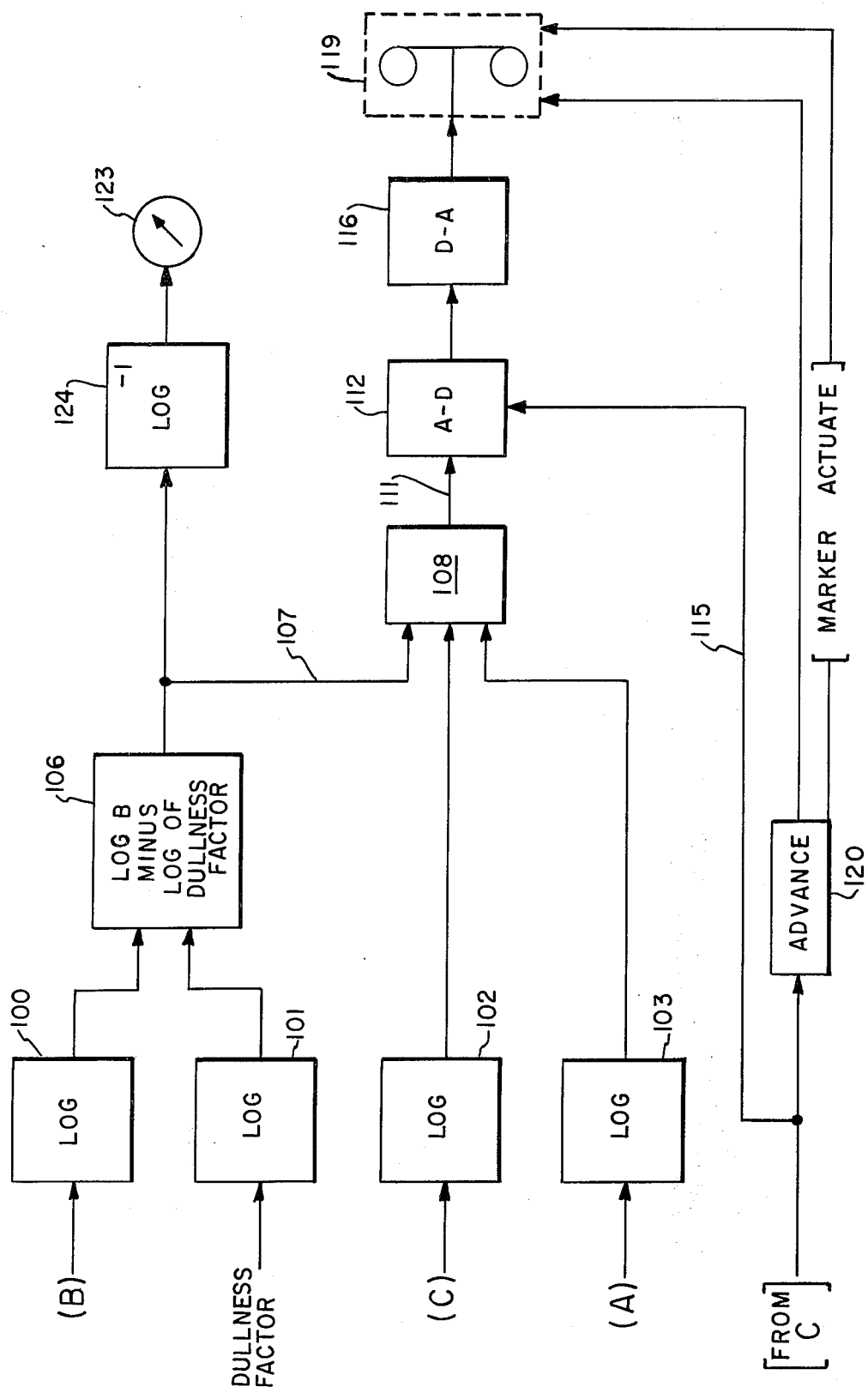
FIG. 5 is a block diagram indicating the use of analog circuits instead of the digital calculator which is used in the modification illustrated in FIGS. 1-4.

FIG. 5 illustrates in block-diagram form an analog system which may be used instead of the digital calculator indicated in FIG. 4 of the prior modification.

Thus, as illustrated in FIG. 5, there are four logarithmic amplifiers 100, 101, 102 and 103 which have as inputs thereto signals representing the quantities indicated by the capital letters A, B, and C (see FIGS. 1 and 4) as generally described in the previous modification. In other words, signal B represents the total turns of the drill string, signal C represents the depth while drilling, and signal A represents the weight-times-number of turns. In addition, the fourth signal represents the dullness factor. The latter is a predetermined input signal for amplifier 101 so that the dullness determination, which was previously carried out within the calculator, is now introduced as a predetermined signal that is derived from information concerning the prior drill bits, etc.

It will be understood that these quantities will have been converted from the digital form (described in the prior modification) to analog signals before going into the logarithmic amplifiers 100, 102 and 103, in a manner that is described more fully hereafter with reference to FIGS. 10 and 11.

As indicated, the ratio of the number of turns to the dullness factor is carried out by circuit elements which are illustrated generally by a block 106. This subtracts the logarithms. The resulting subtraction of logarithmic quantities which is carried out by the circuit elements represented by block 106, provides an output that represents the indicated ratio which is transmitted over a circuit connection 107 to one input of a circuit element 108. The element 108 also receives inputs from the logarithmic amplifiers 102 and 103, in order to carry out the development of the lithological parameter according to the mathematical expression indicated by the equation (1), set forth in the description of the prior modification.

Output from the element 108 is carried over a connection 111, and it is an analog representation of the desired surface drilling log, or lithological parameter. Then, in order to provide for recording of this quantity, there is an analog-to-digital converter 112 where periodic depth signals are introduced, as indicated by a circuit connection 115. Such depth signals are periodically developed from the continuous depth signals, as is indicated by the caption FROM C. The digitally represented quantity out from converter 112 is then connected to a digitalanalog conversion circuit 116 in order to produce an analog signal that is connected to a recorder 119 for making a continuous record of the drilling parameter at periodic depths during the drilling process.

It will be noted that in connection with the recording of the data by the recorder 119, there are signals provided to control the periodic advance of the recording medium (e.g., a strip chart), as is indicated by a block 120 captioned ADVANCE. This also may supply signals to actuate the pen or marker of the recorder 119 only for a short interval following each step advance of the record.

Also, it will be observed that if desired, there may be a meter 123 to continuously indicate the dullness of the bit, as drilling progresses. It will be understood that such a meter is energized from the output of an antilogarithmic circuit 24, in order to present the dullness indications in a direct nonlogarithmic form.

Figures 6, 7:
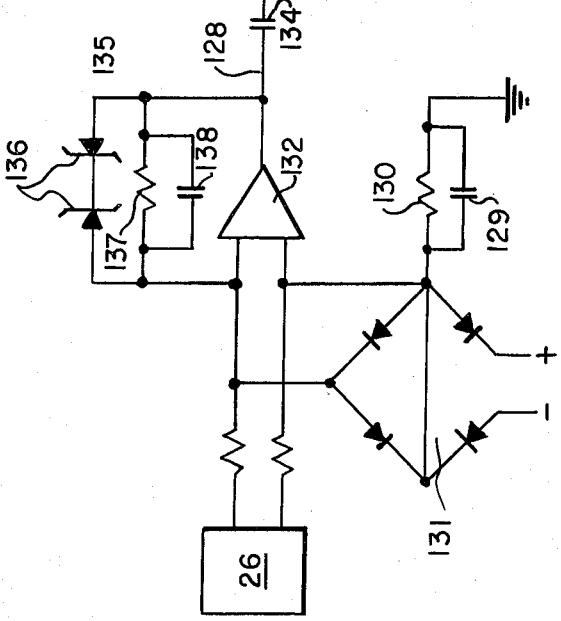
FIG. 6 is a schematic circuit diagram illustrating most of the revolutions channel for the analog modification illustrated in FIGS. 5-12.
FIG. 7 is a schematic circuit diagram illustrating the first part of the depth channel for the analog modification.

FIG. 6 illustrates circuit elements that are employed in the revolutions channel of the analog system illustrated by FIGS. 5–12.

The tachometer 26 (see FIG. 1) is a signal source for the revolutions. It will be appreciated that it might take various forms, as was already indicated above in connection with the prior modification. The AC signals developed are applied to a differential input buffer 132 that has its input protected by a diode array 131.

Buffer 132 has provision for obtaining a desired frequency response by having a resistor 130 and a shunting capacitor 129 together connected from one of the input leads of the buffer 132 to ground, as illustrated. The other input lead has a network circuit 135 connected between it and an output connection 128. The network 135 includes a pair of Zener diodes 136 in parallel with a resistor 137 and a capacitor 138.

Revolutions signals are then carried via a capacitor 134 and a resistor 139 to an amplifier 140, the output of which goes to a comparitor 141 that squares the output of the buffer 132. Then the squared pulses represent a predetermined amount of rotation of the drill string.

There is a gate 144 which holds back revolution signals when the bit is not on bottom in the hole. An OR-type gate 143 passes an enabling signal to the gate 144 when the depth channel indicates that the bit is on bottom, or when a REVOLUTION DISPLAY circuit is actuated.

The output of the gate 144 goes to a counter circuit 145 that includes a correction-circuit arrangement in order to produce (with a high degree of accurary) a single pulse each revolution on an output connection 146. This is indicated by the caption ONE PULSE PER REVOLUTION, which is applied to the output 146.

It is pointed out that the foregoing correctioncircuit arrangement may be in accordance with the principles of the disclosure in a copending application Ser. No. 430,135 filed Jan. 2, 1974 (D No. 73,005).

FIG. 7 illustrates a portion of the depth channel of the analog system (FIGS. 5-12).

The pulse generator 41 is a transducer from which the depth measurements are derived. In the prior modification, it was described as a conventional pulse generator, e.g., one manufactured by Veeder Root Manufacturing Company. In this modification, the pulse generator 41 is preferably one manufactured by the Encoder Product Company, and it is designated as ACCU-CODER, Model 761, which generates ten pulses per revolution. It employs an input voltage of 5 volts DC, and it is constructed with two photoelectric elements. The arrangement is such that it generates two series of pulses with one leading the other by 90 electrical degrees, depending upon which direction the generator is rotated. In order to determine the direction of rotation, so as to identify pulses representing downward movement of the drill string as distinguished from upper movement thereof, there is provided a circuit arrangement including gates and flip-flops, as illustrated. The arrangement also provides for eliminating noise in the signals, and adds some hysteresis effect in order to improve stability so as to eliminate error due to mechanical jitter of the mechanical input connections to the pulse generator 41.

The two-phase signals from the generator 41 are compared to a reference voltage that is a predetermined amount higher than the ground return by using two comparators 156 and 157 along with the circuit elements illustrated that are associated therewith. The outputs of the comparators 156 and 157 swing from ground potential to a high predetermined potential. These outputs are carried over circuit connections 158 and 159, respectively.

A switch 150 is connected to the circuits 158 and 159 in order to provide for reversing the circuits so as to relate a given series of pulses from the pulse generator 41 to the downward direction of movement of the drill string, as indicated above. This is needed because the pulse generator may be mounted on either side of the pulley wheel and its direction of rotation for a given direction of movement of the drill string would be thus reversed.

The depth channel provides signals which are related to a predetermined amount of movement of the drill string up and down in the hole. However, in order to adapt the measurements to a drilling log according to the invention, there must be a provision (as was indicated above in connection with FIG. 3 of the prior modification) for discrimination between upward signals and downward signals. In this (FIGS. 5–12) modification, the upward movement that is accounted for is limited by a predetermined amount so as to avoid any need for concern with upward movements during bit changes, or the like.

As indicated above, the pulse generator 41 produces two-phase signals, and it has three output-circuit connections with the middle one grounded. The outer two circuit connections go to the inputs of the comparators 156 and 157. The outputs of these comparators continue via the connections 158 and 159, respectively, to stationary contacts of the direction-reversal switch 150.

The circuits continue via cross-connected inputs to a group of four gates 163–166. These inputs include a pair of inverters 161 and 162, and the outputs of the gates 163–166 are connected to a pair of flip-flops 169 and 170. The result is to produce signals on output connections 171 and 172 that are the same as the signals on the corresponding connections 158 and 159, respectively, with the exception that the output connection signals on connections 171 and 172 have one-quarter cycle hysteresis.

The output connections 171 and 172 go to inputs of a one-shot multivibrator 173. Also, a cross-connection 168 (from 171) along with another output connection 167 from the flip-flop 170, go to inputs of an additional one-shot multivibrator 174. Consequently, when circuit 171 is at high voltage, a positive edge of a signal on circuit 172 will produce an "up" pulse out from the one-shot 173 over a connection 177 to a gate 175.

On the other hand, when circuit 171 is at high voltage, a negative edge signal on circuit 172 will produce a "down" pulse out from the other one-shot 174 over a connection 178 to another gate 176. Gates 175 and 176 feed into an OR gate 180, and the arrangement is such that the up and down pulses are exclusively ored at the connections 177 and 178 so as to produce pulses for both up and down on a circuit connection 181 leading to an input of a flip-flop 184. There is also a circuit connection 185 connected to 181 so that it carries both direction pulses. Circuit 185 is connected to additional circuits which are illustrated in FIG. 8, where both direction pulses are introduced.

Flip-flop 184 has an output connection 188 that provides a signal which tells the direction of vertical movement represented by the last pulse transmitted through the gate 165.

There is another output circuit from the flip-flop 184 that goes to an inverter 189, with the output thereof connected to the base electrode of a transistor 190. Transistor 190 is connected so as to control application of power to an UP LIGHT 191, which acts to indicate whenever the pulses are representative of upward direction for the drill string.

Figure 8:
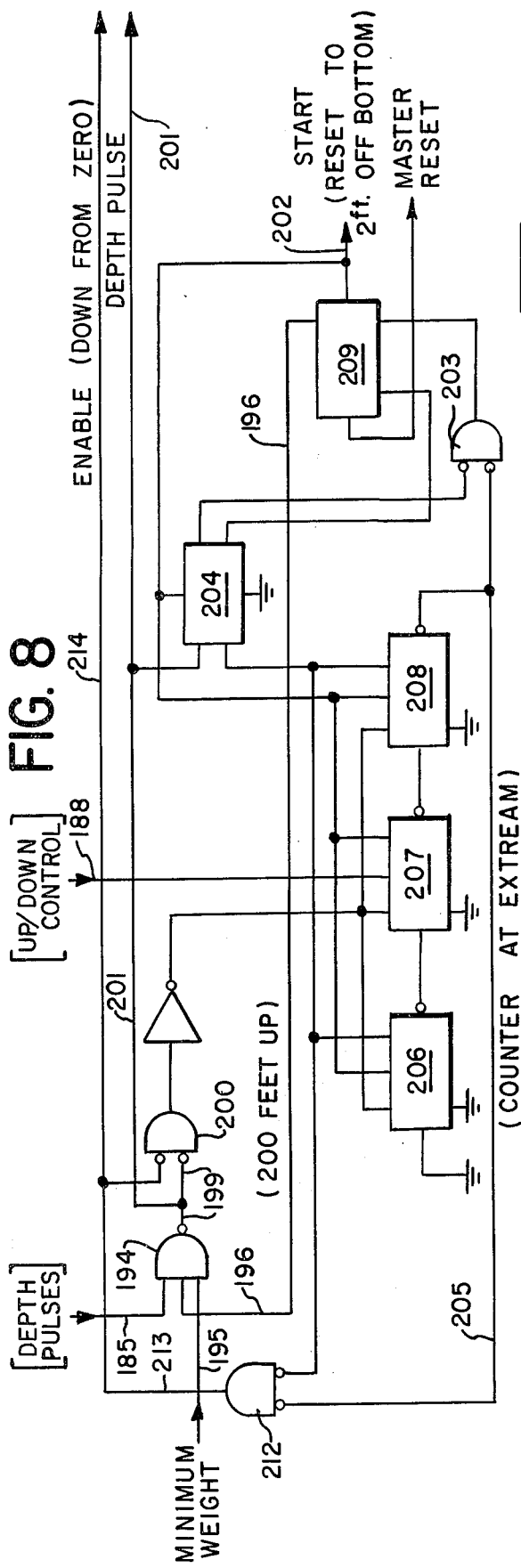
FIG. 8 is a schematic circuit diagram illustrating another part of the depth channel for the analog modification.

FIG. 8 illustrates a control circuit that is related to the vertical direction of travel of the drill string, which was determined by the FIG. 7 circuits. It provides for introducing predetermined control factors such as a requirement for minimum weight suspended by the drill string, and a limitation of upward travel to 200 feet.

The depth pulses for both upward and downward directions are carried over the circuit connection 185 which goes to one input of a gate 194. gare 194 has two other inputs over circuit connections 195 and 196 which, respectively, provide for controlling the output gate 194 in regard to the minimum-weight requirement, and as to whether upward travel distance has been exceeded. The arrangement is such that the gate 194 is in the nature of an AND gate so that if either the upward-travel or minimum-weight requirements are not met, the depth pulses coming over circuit connection 185 are prevented from passing through the gate 194. However, so long as the requirements are being met, these pulses will pass through and be carried over a circuit connection 199 to one input of another gate 200. These same pulses also will be carried over a parallel circuit connection 201 which goes on to a depth-calibration circuit like element 51 (FIG. 3) of the prior modification. This will appear more fully below, particularly in connection with FIG. 9.

In FIG. 8, as indicated above, circuit 196 carries a signal which blocks the gate 194 if an upward travel distance exceeds a predetermined amount which, in this case, is 200 feet. Such signal is derived from a series of counters 206, 207 and 208, in addition to flip-flop 209, which has an output therefrom via the circuit connection 196 to the gate 194.

It may be noted that the circuit connection 188 carries signals representing the nature of the depth pulses, i.e., it is one state when they are up pulses and another state when they are down pulses. The connection 188 leads to inputs of all of the three counters 206, 207 and 208, as well as to input of a gate 212. The arrangement is such that the counters 206, 207 and 208 count in either direction from zero up to the number that represents the maximum upward travel of 200 feet, and down to zero. When zero is reached counting down, there is a signal on a circuit connection 205 that also goes to the gate 212. Then, an output-circuit connection 213, from the gate 212, goes to another input of the gate 200, where the depth pulses on the connection 199 will no longer be passed through this gate 200 to the counters 206–208 but only on over the parallel circuit connection 201. At the same time, the circuit connection 213 is continued over another circuit connection 214 so as to provide an "enable" signal, as indicated by the caption. This signal is used to indicate downward movement of the drill string which, of course, is used in determining the drilling log. However, it should be noted that while counting down from between the 200 feet up and zero, this enabling signal is not present so that the depth pulses going through the gate 194 will not be so used in the drilling-log determination.

It should also be noted that other nondrilling-log but drilling-related functions are provided for which need not be described. For example, there is an element 204 and a gate 203 as well as other elements not shown, which provide for conditions when a drilling operation is commenced. Thus, there is a circuit connection 202 that has the caption START — (RESET TO 2 FT. OFF BOTTOM) applied, and there is similar equipment (not shown) in relation to the situation when the bit is eight-tenths of a foot off bottom.

Figure 9:
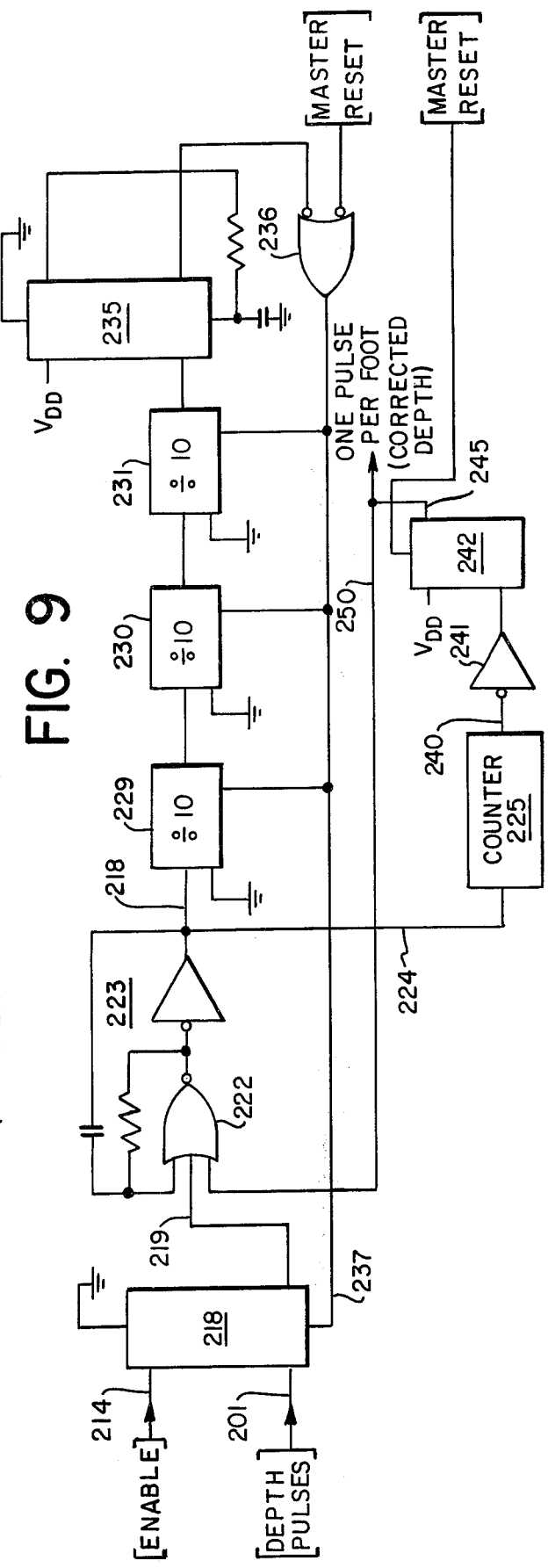
FIG. 9 is a schematic circuit diagram illustrating a depth-correction system that is applied to the depth channel illustrated in FIGS. 7 and 8.

FIG. 9 illustrates another portion of the depth channel for this modification. One function of this portion is to produce a single pulse per foot of travel, which pulse occurrance has been corrected for accurate depth measurement. Again, in this instance, this may be done in accordance with the principles of the procedure which is described and claimed in a copending application Ser. No. 430,135 filed Jan. 2, 1974, titled HIGHLY ACCURATE ODOMETER. However, before such correction takes place, the arrangement here includes flip-flop 218 which has as one input the circuit connection 214 (see FIG. 8), which carries an enable signal representing the condition when downward travel exists after the zero point has been reached during drilling. Another input to the flip-flop 218 is the circuit connection 201 (see FIG. 8), which carries the depth pulses. These are only permitted to pass when the proper signal exists on the enable circuit 214.

There is an output circuit connection 219 from the circuit 218 which goes to one input of three into an OR gate 222. The output of gate 222 includes a high-frequency oscillator 223 which has an output circuit connection 224 that goes to the input of a counter 225.

The output of oscillator 223 also goes via a connection 228 to the input of a series of divide-by-ten counters 229, 230 and 231, which produce an output pulse after counting one thousand of the pulses from the oscillator 223. Then the output pulse from the counter 231 goes to an input of flip-flop 235 which has an output via a gate 236 over a circuit connection 237 to the flip-flop 218. This shuts off the oscillator 223 and resets the counters 229-231, so that the effect is to multiply the depth pulses on the circuit 201 by one thousand.

The depth pulses multiplied by one thousand are sent to the counter 225, which includes the pulse-count control for accuracy mentioned above, in order to produce a single pulse per foot of corrected depth for the drill string. Such single pulse is produced on a circuit connection 250 after going from the output of the counter 225 via a circuit connection 240 and an inverter 241 to a flipflop 242 and a circuit connection 245. The circuit 250 leads to an arrangement for converting these digital depth signals to an analog parameter.

FIG. 10 illustrates the end of the depth channel where an analog signal representing the depth is produced. It will be noted that the circuit connection 250 (carrying pulse signals each representing one foot of corrected depth) is applied to a counter 255, as well as to the inputs of a pair of flip-flops 256 and 257. The flip-flops are employed to provide an output every other pulse so that a "2-foot pulse" is developed over a circuit connection 260. This is employed in controlling the initiation of an individual determination of the drilling log data, each two feet of depth.

The counter 225 makes a cumulative total count of the downward penetration of the bit, and the output is carried over a circuit connection 263 to a digital-to-analog converter. This converter has an output in the form of an analog voltage which is carried over circuit connection 267, and which represents the depth quantity that is to be employed in determining the drilling log.

FIG. 11 illustrates the portion of the system that provides analog signals representative of the total turns as well as the weight times the revolutions.

Thus, the output of the revolutions channel, illustrated in FIG. 6, goes over the circuit connection 146 which is divided into parallel inputs for the digital-to-analog converters 271 and 272. The output of converter 271 goes over a circuit connection 275 which carries an analog voltage representative of the total turns, as indicated by the caption. The other input connection from circuit 146 goes over a connection 276 to one input of the converter 272. This converter also has an input via a circuit connection 278 from a weight transducer 279. This transducer employs a variable resistor (not shown) that has a resistance which is a linear function of the weight. Also, there is provision made (not shown) for adjusting the amplification in accordance with the number of lines employed in the pulleys of the particular rig being used.

These two inputs to the converter 272 are combined to produce the product, i.e., weight-times-revolutions, as an analog voltage which is carried over a circuit connection 282. It will be understood that the analog signal on circuit connection 278 is transformed to a digital form as the weight is multiplied by the revolutions. Then pulses representing weight-times-revolutions are converted to the analog signal (A) illustrated in FIG. 11, which is carried by the circuit 282.

Following the conversions by the converters 271 and 272 of FIG. 11, in addition to the conversion by the converter 264 of FIG. 10, there are analog quantities according to the captions. Consequently, these represent the measured data indicated. These signals are then combined as indicated, in general, with reference to FIG. 5 above, so as to produce the desired surface-drilling log.

Figure 12:
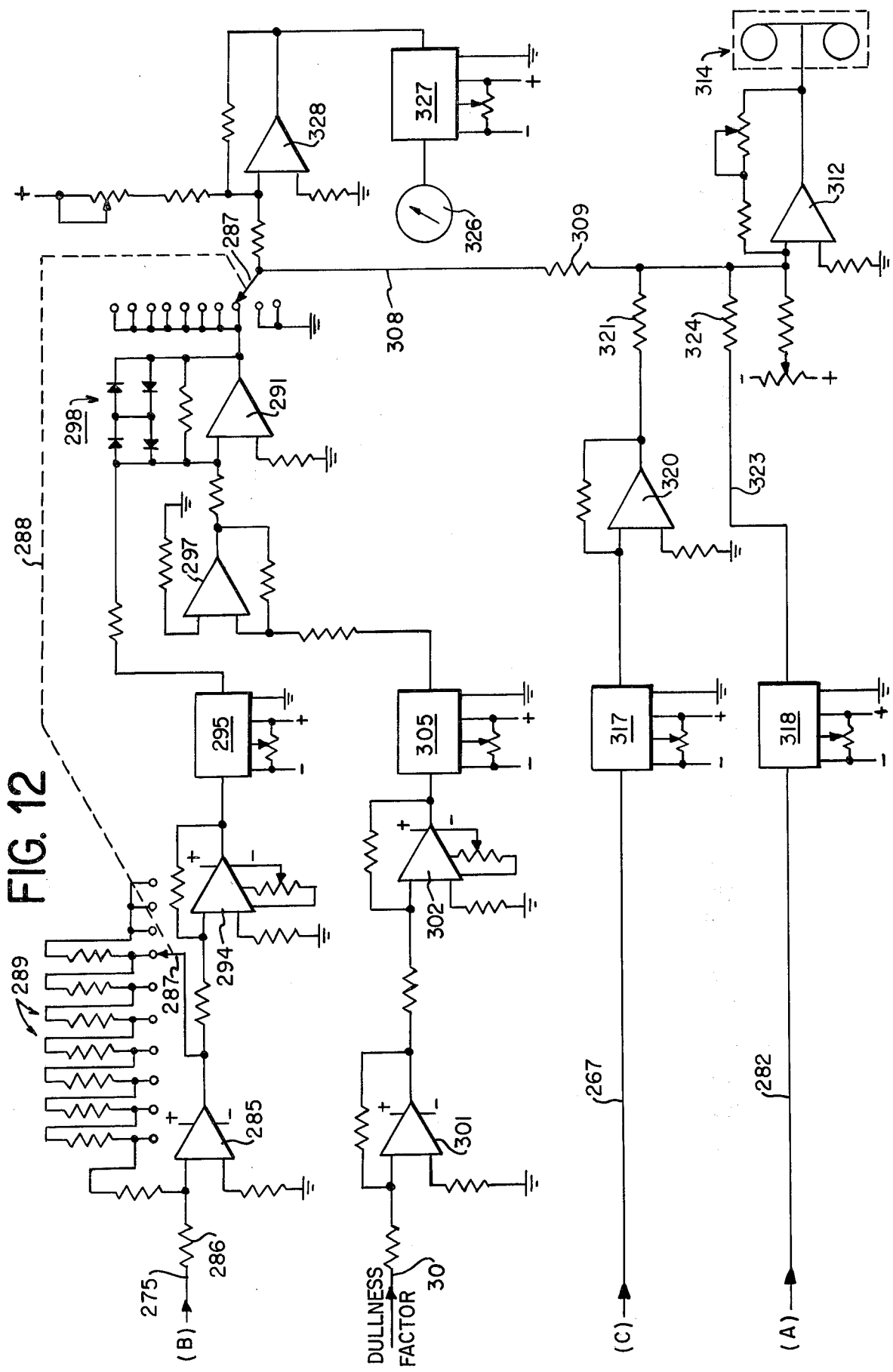
FIG. 12 is a schematic circuit diagram illustrating in more detail the analog system illustrated in FIG. 5.

FIG. 12 shows with greater specificity the elements involved in this modification of the invention during the final data-handling procedures so as to produce the desired drilling log, as was generally described with reference to FIG. 5.

Thus, the total turns analog voltage (B) is applied over the circuit connection 275 (see FIG. 11) into one of the input connections to an amplifier 285 via a resistor 286. The amplifier 285 has the gain thereof controlled in steps which are determined by the position of a switch 288. Switch 288 controls a pair of ganged movable contactors 287, as illustrated, which are electrically connected to the outputs of the amplifier 285 and another amplifier 291.

It will be observed that the stationary contacts adjacent to the amplifier 285 are electrically connected to a series of resistors 289 so as to create the desired steps of gain from one to eight-tenths, while it remains the same for the last two steps of the entire ten steps. At the output of the amplifier 291, the first eight steps have the corresponding stationary contacts connected in common, while steps nine and ten remove the variable dullness factor and substitute a predetermined signal representing dullness before the bit has become worn an arbitrary amount, as was explained in connection with the equation (2) set forth above in regard to the prior modification related to FIGS. 1–4. Thus, a tooth-grading determination is applied to the turns channel in the modification of FIGS. 5–12.

The output amplifier 285 goes to the input of another amplifier 294 which has its output connected to a logarithmic amplifier 295. Then, the output of logarithmic amplifier 295 goes to the input of another amplifier 291, which has two functions. Thus, it includes a network of diodes 298 in order to limit the signal amplitude to a predetermined range, while it acts to sum the outputs of the logarithmic amplifier 295 and that of an amplifier 297. Amplifier 297 has its input fed by an analog signal that has been predetermined and represents a final number of turns from a previous bit. Such signal is introduced at a circuit connection 300 which has the caption DULLNESS FACTOR applied. There are two amplifiers 301 and 302 that, together, have a gain of 8/10 and feed into a logarithmic amplifier 305.

It will be recalled that the dullness determination involves a ratio, and the desired ratio is obtained by subtracting the logarithmic output signals from amplifiers 295 and 305. This is carried out by employing the indicated summing input circuit to the amplifier 291. The ratio signal output is then carried over a circuit connection 308 and via a resistor to one of the parallel inputs of a final amplifier 312, the output of which goes to a recorder 314.

The other two active inputs for amplifier 312 are provided over the circuit connections 267 and 282 which lead to logarithmic amplifiers 317 and 318, respectively. The output of logarithmic amplifier 317 is carried via an amplifier 320 and a resistor 321 to become one of these active inputs for the amplifier 312. similarly, the signals on the output of the logarithmic amplifier 318 are connected directly via a circuit connection 323 and a resistor 324 to become the other active input of amplifier 312. This circuit arrangement provides for the analog combination of the various signals in the manner required by this invention, so as to produce an output that represents the surface drilling log.

It will be noted that there may be a provision for having a continuous indication of the dullness determination for the bit during drilling. Thus, there is a meter that has its input signal fed from an antilog amplifier 327 which takes its input in turn from an amplifier 328 that has its input connected to the circuit connection 308.

It will be appreciated by anyone skilled in the art that appropriate electrical and electronic elements are commercially available for use in constructing a system according to the invention. Also, it will be understood that the symbols employed to indicate gates, buffers, inverters, etc., are conventional, e.g., the OR-type gates have curved input shapes and pointed output, while the AND types have flat input and blunt round output shapes. Also, the location of the small circles at input or output indicates whether the gates are Neg. AND, Neg. OR, or NAND, and NOR types. Appropriate elements are illustrated and described in various published sales literature issued by electronics manufacturers. For example, some of the elements may be chosen from "Digital Integrated Circuits" of the CD 4000 A series manufactured by RCA Solid State Division. Also, digital-analog converters may be like those manufactured by Zeltex, Inc. of Concord, Calif. 94520, while log/antilog amplifiers are manufactured by Analog Devices Inc. of Norwood, Mass. 02062.

The foregoing modifications are illustrated and described in considerable detail in accordance with the applicable statutes. However, this is not to be taken as in any way limiting the invention, but merely as being illustrative thereof.

I claim:

1. In rotary-type borehole drilling wherein a bit is attached to the lower end of a drill string that is rotated while the downward force on said bit is controlled, the method of developing a surface drilling log which comprises the steps of
    measuring the revolutions of said bit,
    measuring the depth of said bit in the borehole,
    measuring the weight on said bit,
    determining the tooth dullness of said bit, and
    determining a characteristic of the formation being drilled by combining said measurements and said tooth-dullness determination.

2. In rotary-type borehole drilling, a method according to claim 1, wherein said tooth-dullness determination comprises
    taking the ratio of the number of revolutions of said bit to a predetermined number representing a given dullness.

3. In rotary-type borehole drilling, a method according to claim 2, wherein
    said depth-measuring step comprises cumulating incremental displacement of said bit in a downward direction only.

4. In rotary-type borehole drilling, a method according to claim 3, wherein
    said depth-measuring step also comprises calibrating said cumulative measurements.

5. In rotary-type borehole drilling, a method according to claim 4, wherein said tooth-dullness determination comprises
    taking the ratio of the number of revolutions of said bit to a predetermined number representing a given dullness.

6. In rotary-type borehole drilling, a method according to claim 3, wherein said tooth-dullness determination comprises
    taking the ratio of the number of revolutions of said bit to a predetermined number representing a given dullness.

7. In rotary-type borehole drilling, a method according to claim 1, wherein
    said revolution-measuring step is carried out by increments of a revolution,
    said weight-measuring step is carried out by converting said weight to pulses, the frequency of which is proportional to said weight, and
    wherein said characteristic determination comprises correlating said depth measurement with a count of said weight pulses during each of said revolution increments,
    said correlating being carried out over predetermined intervals of said depth.

8. In rotary-type borehole drilling, a method according to claim 7, wherein said tooth-dullness determination comprises
    taking the ratio of the number of revolutions of said bit to a predetermined number representing a given dullness.

9. In rotary-type borehole drilling, wherein a bit is attached to the lower end of a drill string that is rotated while the downward force on said bit is controlled, a method of developing a surface drilling log which comprises the steps of
   measuring the revolutions of said bit by increments of a revolution,
   measuring the depth of said bit in the borehole by cumulating incremental displacement in a downward direction only and calibrating said cumulative measurement to correct the total periodically,
   measuring the weight on said bit and converting said weight to pulses, the frequency of which is proportional to said weight,
   determining the tooth dullness of said bit by taking the ratio of the number of revolutions of said bit to a predetermined number, and
   determining a characteristic of the formation being drilled by correlating said depth measurement with a count of said weight pulses during said revolution increments over a predetermined interval of said depth and with said revolutions as modified by said dullness determination.

10. In rotary-type borehole drilling, wherein a bit is attached to the lower end of a drill string that is rotated while the downward force on said bit is controlled, the method of developing a surface drilling log to indicate at least one parameter of the formation being drilled, comprising the steps of
   measuring the revolutions of said bit by increments of a revolution,
   measuring the depth of said bit in the borehole by cumulating incremental displacement of said bit in downward direction only and calibrating said cumulative measurements by algebraically adding one of said increments after a predetermined number thereof,
   measuring the weight on said bit during said increments by converting said weight to pulses, the frequency of which is proportional to said weight,
   determining said parameter by correlating said depth measurement with a count of said weight pulses during revolution increments over a predetermined interval of said depth, and
   recording said parameter on a record medium while translating said medium in accordance with said depth of the bit while drilling.

11. A surface drilling log system for use with rotary-type well-drilling equipment having a bit attached at the lower end of a drill string and including means for rotating said string and bit while controlling the downward force on said bit, comprising in combination
   means for measuring the depth of said bit in the well,
   means for measuring the revolutions of said bit in drilling the well,
   means for measuring the weight on said bit as the well is drilled,
   means for determining the dullness of said bit as the well is drilled, and
   means for correlating said measurements and determination to provide a log of characteristics of the formation being drilled.

12. A surface drilling log system according to claim 11, wherein said means for correlating comprises
   a calculator, and
   means for recording said characteristics log.

13. A surface drilling log system according to claim 12, wherein said means for determining dullness comprises
   means for counting the number of said bit revolutions, and
   means for comparing said count with an arbitrary number representing a final dullness.

14. A surface drilling log system according to claim 13, wherein said means for recording comprises
   a record medium, and
   means for advancing said record medium in accordance with said dpeth of the bit.

15. A surface drilling log system according to claim 12, wherein said means for recording comprises
   a record medium, and
   means for advancing said record medium in accordance with said depth of the bit.

16. A surface drilling log system for use with rotary-type well-drilling equipment having a bit attached at the lower end of a drill string and including means for rotating said string and bit while controlling the downward force on said bit, comprising in combination
   means for measuring the depth of said bit in the well,
   means for measuring the revolutions of said bit comprising means for generating gate signals at predetermined increments of said bit revolutions,
   means for measuring the weight on said bit during said increments of the revolutions as the well is drilled comprising means for generating variable-rate pulses at a rate dependent upon said weight,
   means for correlating said measurements to represent a parameter of the formations being drilled comprising means for counting said variable-rate pulses during said increments to produce a product of weightimmes-revolutions,
   means for recording said correlation of said measurements on a record medium as it is advanced, and
   means for advancing said record medium in accordance with the depth of said bit.

* * * * *